United States Patent [19]
Sato

[11] Patent Number: 5,731,689
[45] Date of Patent: Mar. 24, 1998

[54] CONTROL SYSTEM FOR A.C. GENERATOR

[75] Inventor: Hirohide Sato, Toyokawa, Japan

[73] Assignee: Nippondenso Co., Ltd., Kariya, Japan

[21] Appl. No.: 658,613

[22] Filed: Jun. 5, 1996

[30] Foreign Application Priority Data

Jun. 6, 1995 [JP] Japan .................. 7-139735
Jun. 6, 1995 [JP] Japan .................. 7-139736

[51] Int. Cl.$^6$ .................. H02P 11/04; H02P 9/14
[52] U.S. Cl. .................. 322/25; 322/20; 322/29; 363/132
[58] Field of Search .................. 322/25, 26, 27, 322/28

[56] References Cited

U.S. PATENT DOCUMENTS

| | | | |
|---|---|---|---|
| 4,459,489 | 7/1984 | Kirk et al. | 290/13 |
| 4,636,706 | 1/1987 | Bowman et al. | 322/28 |
| 4,733,159 | 3/1988 | Edwards et al. | 323/282 |
| 4,739,243 | 4/1988 | Iwatani et al. | 322/10 |
| 5,157,321 | 10/1992 | Kato et al. | 322/28 |
| 5,254,935 | 10/1993 | Vercesi et al. | 322/29 |
| 5,335,071 | 10/1994 | Ishida et al. | 320/6 |
| 5,444,354 | 8/1995 | Takahashi et al. | 322/28 |
| 5,448,154 | 9/1995 | Kamke et al. | 322/28 |
| 5,512,813 | 4/1996 | Uchinami | 322/28 |
| 5,543,703 | 8/1996 | Kusase et al. | 322/16 |
| 5,608,616 | 3/1997 | Umeda et al. | 363/132 |

FOREIGN PATENT DOCUMENTS 63-137542  9/1988  Japan .
4-138030   5/1992  Japan .

OTHER PUBLICATIONS

IECEC 93 Aug. 8–13, 1993, Atlanta, Georgia, Proceedings of the 28th Intersociety Energy Conversion Engineering Conference, vol. 1, Aerospace Power Conversion Technology, Electrochemical Conversion, pp. 1249–1254.

*Primary Examiner*—Steven L. Stephan
*Assistant Examiner*—Nicholas Ponomarenko
*Attorney, Agent, or Firm*—Cushman Darby & Cushman IP Group of Pillsbury Madison & Sutro LLP

[57] ABSTRACT

An exciting current controlling transistor or a high-side switch or low-side switch of a three-phase full-wave rectifier for an on-vehicle a.c. generator is formed of a MOS power transistor made of a monocrystalline SiC semiconductor. Further, at high output condition time, for example, a state wherein the generator is in a condition of low temperature and a battery capacity is decreased, a controller suppresses the duty ratio of the exciting current controlling transistor to thereby limit a field coil exciting current. As a result, an increase in cross-sectional area of the electric wire or a temporary rapid increase in torque of the engine load is avoided. Also, by limiting the rate of increase in the duty ratio, the controller prevents a fall in the engine speed.

12 Claims, 13 Drawing Sheets

CONTROL SYSTEM FOR A.C. GENERATOR

BACKGROUND OF THE INVENTION

1. Field of the Invention

The present invention relates to a control system for an a.c. generator which is equipped with an exciting current controlling transistor for PWM control of an exciting current and rectifying circuit for performing full-wave rectification with respect to a generated voltage.

2. Description of Related Art

In an on-vehicle a.c. generator, three-phase a.c. voltages output from three-phase armature windings wound around a stator core are rectified by a three-phase full-wave rectifier and are supplied to the battery of a vehicle.

To control the output current of the on-vehicle a.c. generator, generally, a field coil and a switching transistor are connected in series with each other between both output terminals of the three-phase full-wave rectifier, whereby exciting current supplied to the field coil is on/off controlled through operation of the switching transistor, which is provided in an exciting current control device. Usually, this exciting current control device is disposed on an inner or outer surface of the on-vehicle a.c. generator for the purpose of shortening the electrical connection wirings, decreasing the electromagnetic noise radiation, etc. Conventionally, as this switching transistor, there is used a bipolar transistor (hereinafter, referred to as "Si-BPT") or MOS power transistor (hereinafter, referred to as "Si-MOST") which uses silicon (S) as a base material.

Unexamined Japanese Patent Application Publication No. 4-138030 has proposed the provision of a three-phase full-wave rectifier wherein a high side switch and low side switch thereof, making individual connections between respective output terminals of three-phase armature windings and high and low voltage terminals of a battery, are each constructed using a MOS transistor.

Usually, as this type of MOS transistor, a vertical MOS power transistor is adopted, wherein for the purpose of ensuring the withstand voltage and decreasing the on-resistance, an N-type silicon substrate is made to be one main electrode of the MOS power transistor and an N$^+$ type region constituting the other main electrode is formed in a surface portion of a P-type well region formed in a surface portion of the chip.

(First Problem)

There, there has recently been an increasing demand for an increase in the output current of an on-vehicle a.c. generator because of a recent increase in the on-vehicle electrical load. The relationship between the output current of the on-vehicle a.c. generator and the characteristic of the switching transistor will now be analyzed.

The maximum temperature rise permissible with respect to a MOS power transistor (MOST) or bipolar power transistor (BPT) serving as a switching transistor is limited to, for example, several tens of degrees as measured in terms of the surface temperature thereof. The maximum permissible generated heat quantity Qmax of the switching transistor is limited by this permissible temperature rise $\Delta T$. The maximum permissible generated heat quantity -max is expressed by the equation: $Qmax=r \times Imax^2 f$ (rt, S, $\Delta T$) where r represents the on-resistance r of the switching transistor, Imax represents the maximum exciting current, f represents a function of the heat radiation resistance rt, and the heat radiation area S and the temperature rise $\Delta T$.

The on-resistance of a conventional transistor constituting the switching transistor for use in a control system for on-vehicle a.c. generator had a prescribed minimum value.

That is, in the on-vehicle a.c. generator, the amount of magnetic energy accumulated in the three-phase armature windings or field coil is large, when such accumulated magnetic energy is instantaneously liberated or discharged by, for example, disengagement from the battery terminal, generation of the load dump voltage, etc., an extremely high surge voltage is applied to the switching transistor through the high voltage terminals of the three-phase fullwave rectifier. For this reason, this switching transistor needs to be designed to have a high withstand voltage specification (for example, 250 V or more in the case of a rated 14-V on-vehicle a.c. generator).

However, since the conventional Si-BPT or Si-MOST using silicon as a base material has a prescribed avalanche breakdown field intensity, when desiring to increase the withstand voltage without being followed by breakdown of the transistor, the withstand voltage layer could not but be made small in thickness and low in impurity concentration, with the result that the resistivity of the switching transistor could not be decreased down to a prescribed, or smaller than prescribed, value. Additionally, although an increase in the chip size is effective to decrease the on-resistance r, increasing the chip size beyond a certain limit (e.g., 10-millimeter square) is difficult because of a decrease in the yield. Accordingly, the on-resistance r of the conventional switching transistor is limited to a prescribed, or greater than prescribed, value because of the high resistivity of the voltage-resisting layer and the limited chip area.

That is, in the on-vehicle a.c. generator, because generation of a high surge voltage resulting from liberation of the magnetic energy occurs, the switching transistor has a high on-resistance r. For this reason, it is understood that in order to make the amount of heat generated from the switching transistor to be at a prescribed, or smaller than prescribed, maximum permissible generated heat quantity Qmax, the maximum exciting current Imax must be limited to a relatively small value or less.

Since the maximum magnetic flux quantity 100 max of the on-vehicle a generator is approximately proportional to the maximum exciting current Imax and the output power thereof depends on the maximum magnetic flux quantity 100 max, it is understood that, after all, an increase in the output of the on-vehicle a.c. generator is strongly limited by a high withstand voltage performance demanded of the switching transistor for the on-vehicle a.c. generator.

Although in order to increase the maximum permissible generated heat quantity Qmax of the switching transistor, i.e., maximum exciting current Imax, it is of course possible to use a plurality of switching transistors in parallel-connected form. However there are the problems with the element cost and required space.

It is also possible to increase the maximum exciting current Imax by improving the heat radiation characteristic of the switching transistor. However, because the switching transistor usually is disposed on an end surface of the housing of the on-vehicle a.c. generator, installing a large-sized heat radiation fin or the like increases the physical construction of the on-vehicle a.c. generator and increases in the ventilation resistance, with the result that such installing is difficult.

Further, since in most cases the switching transistor is disposed on an end surface of the housing of the on-vehicle a.c. generator, it is influenced by the heat generated within the generator or the heat of, for example, the engine through this housing. On the other hand, the cooling air is small in air volume during idle or the like and therefore, when the temperature of the external air is high and an electrical load is high, the ambient temperature of the switching transistor becomes appreciably high (e.g., 135° C.). Accordingly, the permissible temperature rise ΔT which is permissible with respect to the switching transistor is severely limited in this concern. As a result, the maximum permissible generated heat quantity Qmax and maximum exciting current Imax, or even the output current of the on-vehicle a.c. generator becomes further limited.

(Second Problem)

Since the three-phase full-wave rectifier using a MOS power transistor has a construction wherein a parasitic diode functioning as a PN junction diode of a conventional three-phase full-wave rectifier and the MOS power transistor are connected in parallel with each other, there is the possibility that it can be decreased in power loss compared with a conventional three-phase full-wave rectifier using a silicon diode by the extent to which no forward voltage drop occurs in the junction diode.

However, through an analyses made by the present inventors, it has been proved that the above-mentioned MOS power transistor type three-phase full-wave rectifier has the following problems.

In the on-vehicle a.c. generator, since the amount of the magnetic energy accumulated in the three-phase armature windings and field coil is large, it is necessary as a countermeasure with respect to an occurrence of instantaneous release of the magnetic energy that the withstand voltage of each of the power semiconductor elements constituting the three-phase full-wave rectifier be set to be not less than twenty times higher than the battery voltage, i.e., output rectified voltage of the three-phase full-wave rectifier, for example, 300 V or so.

Also, while there has been an increasing demand for 100 A or more of output current with a recent increase in the on-vehicle electrical loads (e.g. defrosting heater and the like), this high withstand voltage and large current structure of MOS power transistor incurs a power loss which is same as that of the diode. This means that intentional use of a complex structure of MOS power transistor in place of a diode becomes meaningless.

The abovementioned problems of the MOS power transistor type three-phase full-wave rectifier will be analyzed hereafter in more detail. The conventional MOS power transistor type three-phase full-wave rectifier is composed of high side switches making individual connections between the output terminals (also called "phase output terminals") of the respective armature windingss and the high voltage terminal of the battery and low side switches making individual connections between the output terminals (also called "phase output terminals") of the respective armature wingding and the low voltage terminal of the battery, the pair of a high side switch and a low side switch connected to the same armature windings constituting a single inverter circuit. When constructing the high side switches and low side switches using MOS power transistors, it is usual to employ vertical channel N-channel MOS power transistors.

It is known that this vertical channel N-channel MOS power transistor has a construction wherein an $n^+$ substrate is connected to a P-well region through an $n^-$ voltage-resisting layer; an $n^+$ surface region is formed in this this P-well region; and the $n^+$ surface region and $n^-$ voltage-resisting layer are conducted to each other through an n-type inversion channel formed in the surface of the P-well region. It is also known that this transistor is used with the $n^+$ surface region and the P-well region being shortcircuited in order to make the potential of the P-well region fixed while the maintenance of the withstand voltage is being ensured by the $n^-$ voltage-resisting layer. It is also known that accordingly a high withstand voltage of parasitic diode is formed between the $n^-$ voltage-resisting layer and the P-well region.

It is important that in the three-phase full-wave rectifier in order to prevent electric charge from occurring from the battery through this parasitic diode, in the high side switch, it is necessary that the $n^+$ substrate be disposed on the high voltage terminal side of the battery while, on the other hand, the $n^+$ surface region be disposed on the armature windings side. Similarly, in the low side switch, it is necessary that the $n^+$ substrate be disposed on the armature windings side while, on the other hand, the $n^+$ surface region be disposed on the low voltage terminal side of the battery.

However, if such dispositions are adopted, when charging the battery with a generated current, the $n^+$ substrate disadvantageously becomes an electric source region, namely a region for injecting electrons into the channel region, with the result that the $n^-$ voltage-resisting layer disadvantageously becomes a series resistor (source-parasitic resistor Rs) with respect to this electric source region. That is, this large source-parasitic resistor Rs constituted by the N-type voltage-resisting layer is disadvantageously connected in series between a true electric source terminal S' and a nominal source electrode which is an external terminal.

Assuming, ignoring the threshold value voltage Vt for simplicity, that K represents a proportional constant, ΔVgs represents the gate-source voltage (Vg–Vs), Vg represents the gate voltage, and Vs'=Vs +Idsat·Rs represents the potential of the substantial source terminal S', the drain saturation current Idsat of the MOS transistor is expressed as follows.

$$Idsat = K (Vg - Vs')^2$$
$$= K (\Delta Vgs - Idsat \cdot Rs)^2$$

That is, it results that the drain saturation current (the maximum current when a prescribed gate voltage has been applied) Idsat corresponds to a state wherein the gate voltage Vg has decreased by the extent corresponding to the Idsat Rs. The variation in the threshold value voltage Vt due to the substrate effect is also ignored here.

Assuming, for example, that the gate voltage is +20 V, the source (battery) potential is +12 V, the current is 100 A and the source-parasitic resistor Rs has a resistance value of 0.05 Ω, it results that the actual source potential Vs becomes 17 V and the channel current is decreased down to 9/64 compared with a case where the Rs has a resistance value of 0. That is, it is understood that the channel current is extremely decreased due to a very small increase in the value of the source-parasitic resistor Rs. This current decrease effect, in other words, channel resistance increase effect will hereinafter be referred to as "the source resistance feedback effect".

Although the above equation is one which holds true in the drain current saturation range, in a non-saturation range as well, the drain non-saturation current similarly decreases due to an increase in value of Rs. This decrease in the drain current means an increase in the channel resistance. Therefore, it is understood that since the increase in the resistance value of the source-parasitic resistor Rs is followed by not only the power loss resulting from itself but also the power loss resulting from the increase in the channel resistance, it is as a whole followed by large power loss and generated heat quantity.

Although in the conventional MOS power transistor structure it is of course possible to make the $n^-$ voltage-resisting layer thin in order to decrease the resistance value of the source-parasitic resistor Rs, since as stated before, a withstand voltage as high as 300 V is needed for the on-vehicle a.c. generator, thinning the n⁻ withstand voltage layer is difficult.

That is, in an ordinary silicon MOS power transistor, the breakdown field intensity of silicon is approximately 30 V/μm and, therefore if the withstand voltage of 300V is undertaken by the n⁻ voltage-resisting layer alone, the thickness of 10 μm is needed on the assumption that the field intensity within the n⁻ voltage-resisting layer is fixed. When it is assumed that the field intensity within the n⁻ voltage-resisting layer is approximately 30 V/μm, in order for the n⁻ voltage-resisting layer to undertake 300V', the thickness thereof needs to be approximately 20 μm or more and the impurity concentration thereof needs to be approximately $1 \times 10^{15}$ atoms/cm³ or less actually. Forming the n⁻ voltage-resisting layer having such thickness and impurity concentration in order to ensure the withstand voltage is followed by an increase in the resistance value of the source-parasitic resistor Rs, a power loss resulting therefrom and a decrease in the drain current (the large increase in the channel resistance). As a result, in the use of on-vehicle a.c. generator (i.e. in the field of reactance load), it is theoretically difficult for the conventional MOS power transistor type three-phase full-wave rectifier to excel a PN junction diode type three-phase full-wave rectifier, with the drawback that the structure and control thereof are complex. Therefore, the former rectifier had no merit of its being put to practical use.

On the basis of these analyses, it can be appreciated that the MOS power transistor for use in three-phase full-wave rectifier of an on-vehicle a.c. generator is difficult to put to practical use when it is the existing silicon MOS power transistor; a remarkable decrease in the resistance of the withstand voltage is indispensable for realization of a MOS power transistor type three-phase full-wave rectifier; a remarkable decrease in the thickness, and a remarkable increase in the impurity concentration, of the voltage-resisting layer are indispensable for this purpose; and further such a remarkable decrease in the thickness, and such a remarkable increase in the impurity concentration, of the voltage-resisting layer are possible only after a remarkable increase in the breakdown field intensity of the voltage-resisting layer has been realized, the present inventors have discovered that if such an increase in the breakdown field intensity of the voltage-resisting layer can be realized, it is possible to remarkably decrease the power loss and generated heat of the three-phase full-wave rectifier of an on-vehicle a.c. generator.

SUMMARY OF THE INVENTION

The present invention has been made based on the discovery of that increases in the output of an on-vehicle a.c. generator are limited by the characteristic of the above-mentioned exciting current controlling switching transistor.

A first object of the present invention is to provide a control system for an a.c. generator which enables an increase in the output thereof without impairing the reliability of its switching transistor by decreasing the operation margin thereof or impairing cooling of its coil and the like by increasing the ventilation resistance thereof.

A second object of the present invention is to provide a control system for an on-vehicle a.c. generator which enables realization of a decrease in the ventilation resistance thereof, a reduction in the disposition space of its switching transistor and an increase in the economy by simplifying the switching transistor or the cooling structure therefor without being followed by a decrease in the generator output.

A third object of the present invention is to prevent an engine speed from decreasing or becoming unstable due to a rapid increase in the drive torque (engine load torque) occurring when a large electrical load is switched on.

Further, a fourth object of the present invention is to control the duty ratio (conduction rate) of the exciting current controlling transistor and thereby limit the exciting current to suppress a maximum output of the a.c. generator and decrease the engine load torque.

Still further, a fifth object of the present invention is to provide a MOS power transistor type three-phase full-wave rectifier for an on-vehicle a.c. generator which enables a remarkable decrease in the loss and also enables easy cooling thereof compared with the conventional three-phase full-wave rectifier.

The present invention is based on the results of the theoretical analysis that a remarkable increase in the output of the on-vehicle a.c. generator or miniaturization of the switching transistor and the cooling structure therefor can be realized by adopting a monocrystal SiC having excellent breakdown field intensity as the material of an exciting current controlling switching transistor.

That is, it is known that the breakdown field intensity of SiC is approximately 300 V/μm and that of Si is approximately 30 V/μm and, therefore, the breakdown field intensity of SiC is approximately ten times higher than that of Si.

Accordingly, in order to realize the withstand voltage (e.g. 250 V or more) required as the switching transistor of on-vehicle a.c. generator, the thickness of the voltage-resisting layer of the MOS power transistor (hereinafter referred to as "SiC-MOST" as well) made using SiC as a base material can be made to be ⅒ the thickness of the voltage-resisting layer of a Si-BPT or Si-MOST through even a simple comparison therewith.

A more detailed explanation will now be given using an example wherein a MOS power transistor is employed as a switching transistor.

In case of Si, the breakdown field intensity thereof is approximately 30 V/μm. Considering simply that this withstand voltage of 300 V is undertaken by the N-type voltage-resisting voltage layer, the required thickness, impurity concentration and resistivity of the voltage-resisting layer are approximately 20 μm, $1 \times 10^{15}$ atoms/cm³ and approximately 5 Ω·cm, respectively.

On the other hand, assuming that the breakdown field intensity of SiC be 400 V/cm, the required thickness, impurity concentration and resistivity of the N-type voltage-resisting layer are approximately 4 μm, $2 \times 10^{16}$ atoms/cm³ and approximately 1.25 Ω·cm, respectively. Therefore, the resistance of the N-type voltage-resisting layer of the MOS power transistor made of SiC can be decreased down to ¹⁄₂₀ compared with the resistance of the N-type voltage-resisting layer of the MOS power transistor made of Si.

Further, even when a calculation is made adding other resistance components to the resistance of the N-type voltage-resisting layer, calculating, respectively the on-resistances r of Si-BPT, Si-MOST and SiC-MOST with the same designing rule and with the same chip area, it has been proven that the on-resistance r of SiC-MOST is approximately ¹⁄₂₅ of Si-MOST and approximately ¹⁄₁₉ of Si-BPT.

As explained previously, the maximum permissible generated heat quantity Qmax is limited by the maximum permissible temperature rise ΔT permitted by environmental conditions and the like and, assuming that r represents the on-resistance r of the switching transistor and Imax represents the maximum exciting current, is expressed by r×Imax². Therefore, r can be decreased as mentioned above meaning that, assuming that the maximum permissible generated heat quantity Qmax be fixed, the maximum exciting current Imax can be increased up to a value per chip which is approximately 4 to 4.5 times (i.e. $1/(r^{0.5})$) greater. This means that the maximum magnetic flux quantity φmax controllable with the use of a single switching transistor, or even the output of the on-vehicle a.c. generator controllable therewith, can be increased remarkably. Although such increase in the maximum magnetic flux quantity φmax of course needs a corresponding increase in the size of the field coil and field iron core, that such a large quantity of magnetic flux can be controlled with the use of a single switching transistor is an important merit.

Of course, if twenty-five Si-MOSTs are connected in parallel with each other, the on-resistance thereof is decreased down to 1/25, with the result that the same operation can be realized. However, it is difficult to install such a large number of Si-MOSTs or Si-BPTs on an end surface of the generator housing and, even if such installing is possible, since cooling air is sucked from the end surface of the housing into the generator, ventilation and cooling of the interior thereof is difficult. Therefore, realization of such structure is impossible.

Accordingly, only by adopting SiC-MOST as the switching transistor as stated before, it is possible to realize remarkable increase in the output of the on-vehicle a.c. generator.

Meanwhile, when it is assumed that the maximum exciting current Imax be the same and the output of the on-vehicle a.c. generator is at the same level as in the prior art, since the on-resistance r of the switching transistor can be decreased down to approximately 5% of that in the prior art, the generated heat also becomes approximately 5% or so of that in the prior art, with the result that the temperature rise in the element largely decreases, and therefore the cooling structures of the cooling fin and the like become simplified.

Further, since the required space is also greatly decreased, the cooling performance can be increased by making largely open the cooling air intake port at the end surface of the housing.

Also, when assuming that the quantity of heat generated from the switching transistor is the same as in the prior art, it results that the chip area can be decreased down to approximately 1/20. In consequence, a large increase in chip yield and integration of other circuits are realized.

Further, the three-phase full-wave rectifier of the on-vehicle a.c. generator according to the present invention is constructed by connecting MOS power transistors each made using SiC as a base material.

As stated previously, in the on-vehicle a.c. generator, the amount of magnetic energy accumulated in the three-phase armature windings or field coil is large. Therefore, as a countermeasure with respect to an instantaneous release of the magnetic energy, the withstand voltage of each power semiconductor element constituting the three-phase full-wave rectifier needs to be set to a level which is not less than twenty times higher than the battery voltage, i.e., the output rectified voltage of the three-phase full-wave rectifier, for example 300 V or so.

Also, there has been a demand for a large output current of 100 A or more because of recent increase in the in-vehicle electrical load.

Meanwhile, the breakdown field intensity of SiC is approximately 400 V/μm and is approximately thirteen times as high as that of Si. When SiC is used as material of component elements of the three-phase full-wave rectifier of the on-vehicle a.c. generator, the fact that the breakdown field intensity of SiC is very high compared with that of Si as mentioned above has the effect that it is possible to remarkably decrease the power loss of the MOS power transistor. The power loss decrease effect resulting from the difference between the breakdown field intensities will now be explained in further detail.

Considered here by way of example is a case where a withstand voltage of 300 V is ensured using SiC MOS power transistors with respect to the three-phase full-wave rectifier of the on-vehicle a.c. generator. For brevity, it is assumed that 300 V as a whole be withstood all by the N-type voltage-resisting layer.

Assuming for brevity that this withstand voltage of 300 V be withstood by the N-type voltage-resisting layer and assuming that the breakdown field intensity of SiC be 400 V/cm, the required thickness, impurity concentration and resistivity of the N-type withstand voltage layer are approximately 4 μm, $2\times10^{16}$ atoms/cm³ and approximately 1.25 Ω·cm, respectively. On the other hand, the required thickness, impurity concentration and resistivity of the 300 V withstand voltage layer of the above-explained Si-MOS power transistor are approximately 20 μm, $1\times10^{15}$ atoms/cm³ and approximately 5 Ω·cm, respectively. It results therefrom that the resistance of the N-type voltage-resisting layer of the SiC-MOS power transistor can be decreased down to 1/20 compared with that of the N-type voltage-resisting of the Si-MOS power transistor, provided, however, that the impurity concentration of the N-type voltage-resisting layer can of course be made to be lower than that corresponding to the above value in relation to the impurity concentration of the P-type well region.

As a result, the above-constructed three-phase full-wave rectifier of the on-vehicle a.c. generator which uses the SiC-MOS power transistor not only enables a large decrease in the resistance power loss per se of the voltage-resisting layer, i.e. source-parasitic resistor Rs, but also enables realization of a large decrease in the channel resistance due to decrease in the source resistance feedback effect. In addition, due to the synergistic action of these effects, it has an excellent effect in that it incurs only a very low loss compared with the three-phase full-wave rectifier of the on-vehicle a.c. generator using the Si-MOS power transistor and the diode type full-wave rectifier having the same extent of power loss as that of this rectifier and the cooling structure of it also becomes simplified very much.

Further, in the above-mentioned structure of the present invention, since the rate of increase in the duty ratio of the exciting current controlling transistor is limited to a prescribed, or lower than prescribed, maximum rate of increase, it is possible to suppress a decrease in the engine speed or an increase in the rate of fluctuation thereof.

More specifically, when adopting the above-mentioned SiC-MOS power transistor as the rectifying transistor or exciting current controlling transistor, an increase in the output due to a decrease in the rectification loss and a decrease in the loss of the exciting current are realized, whereby such decrease in the loss of the exciting current enables generation of a high output due to an increase in the exciting current.

However, the abovementioned increase in the output resulting from using the SiC-MOS power transistor as the rectifying transistor or exciting current controlling transistor means that at the time of closure of a large electrical load, the generator supplies a large output current in correspondence therewith. This means that the load torque of the engine increases rapidly. Such rapid increase in the load torque of the engine is disadvantageously followed by a decrease in the engine speed or an increase in the rate of fluctuation thereof. Particularly, this decrease in the engine speed raises a troublesome problem in that it causes the engine stall when the engine speed is in such a low speed range as during, for example, idle rotation.

In the construction of the present invention, since the rate of increase in the duty ratio of the exciting current controlling transistor is limited to a prescribed, or lower than prescribed, maximum rate of increase, the occurrence of such a troublesome problem can be avoided when the SiC-MOS transistor has been used as the rectifying transistor or exciting current controlling transistor.

Preferably, the source-drain withstand voltage and source-gate withstand voltage of the MOS transistor is set to be 100 V or more. That is, in this high withstand voltage of transistor, as stated before, it is necessary to provide a voltage-resisting layer which is large in thickness and high in resistivity. For this reason, the on-resistance thereof disadvantageously becomes high, with the result that incurrence of the resulting resistance power loss and voltage loss can not be avoided. However, in the SiC-MOS transistor, the breakdown voltage intensity thereof is much higher than that of the Si-MOS transistor, and therefore the impurity concentration of the voltage-resisting layer can be increased in correspondence therewith. As a result, the resistivity thereof can be decreased very much, and accordingly the resulting resistance power loss and the resulting power loss can be decreased very much.

Further, preferably, since the exciting current controlling transistor and the rectifying transistor consisting respectively of SiC-MOS transistors are accommodated within the same casing and fixed to the housing of the generator, the resulting transistor structure can be miniaturized to thereby decrease the required space. Since the SiC-MOS transistors each having a high withstand voltage necessary for the rectifying transistor and exciting current controlling transistor of the on-vehicle a.c. generator can be decreased in loss as mentioned above, even when they are accommodated within the same casing, their cooling is easy with the result that it is possible to pursue their miniaturization and space reduction by their being accommodated within the same casing.

Further, preferably, the abovementioned maximum rate of increase is decreased when the engine speed is low. It is possible to a prevent a rapid increase in the engine load during low rotation of the engine (e.g. idle rotation) in which engine stall is likely to occur due to a rapid increase in the engine load.

Further, preferably, the limitation of the rate of increase in the exciting current is released during headlight-on travel. It is possible to prevent a fall or fluctuation in the light quantity of the headlight due to occurrence of battery discharge during, for example, overnight travel.

DETAILED DESCRIPTION OF THE PRESENTLY PREFERRED EMBODIMENTS (First Embodiment)

Figure 2:
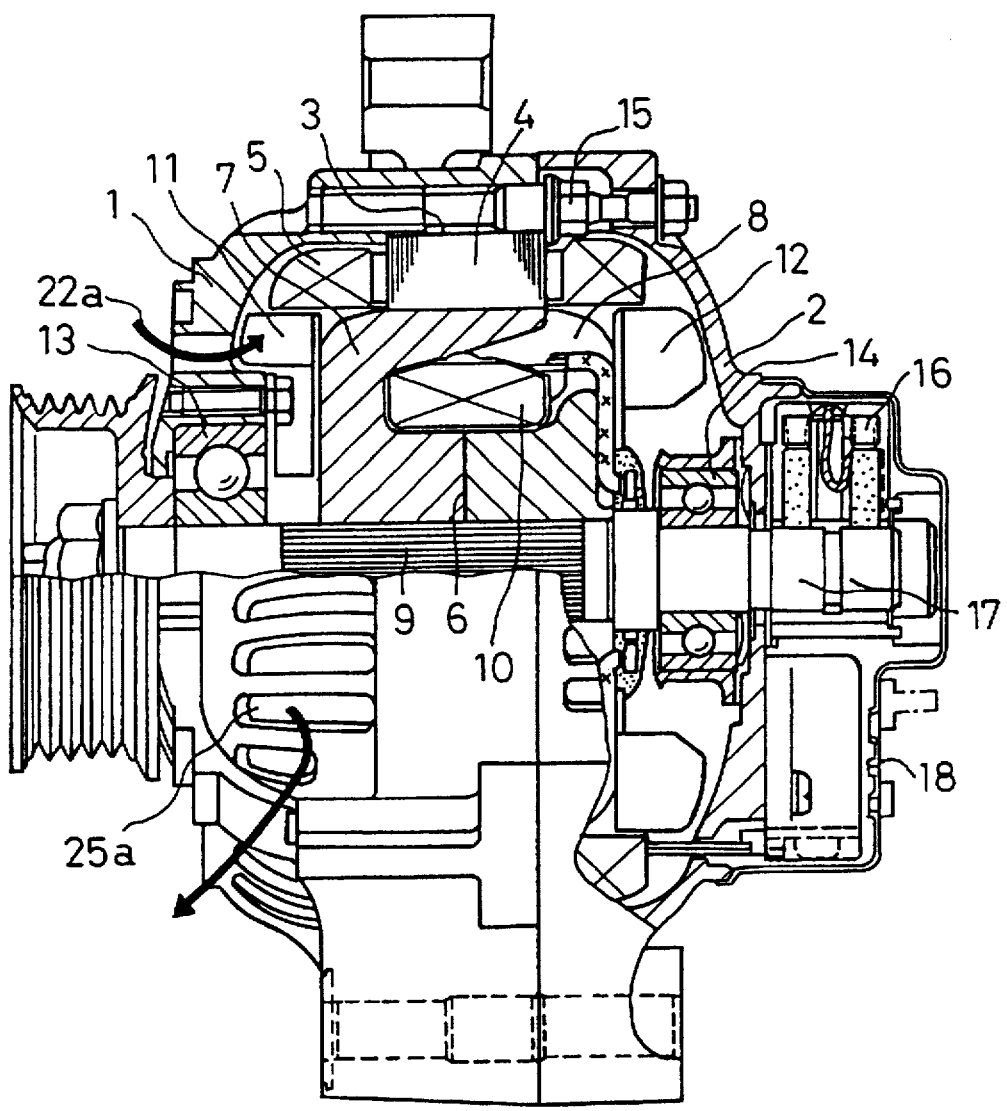
FIG. 2 is a sectional view illustrating the on-vehicle a.c. generator of FIG. 1.

The entire structure of an on-vehicle a.c. generator of this embodiment driven by operation of a vehicle engine, a so-called alternator, will be explained hereunder with reference to FIG. 2.

The outer shell of the generator is composed of a drive frame 1 and a rear frame 2 both of which are connected directly to each other by a plurality of stud bolts 15 or the like and have a plurality of windows 25a for a cooling air flow 22a.

On the inner peripheries of the frames 1 and 2 there is fixed a stator core 3 around which a three-phase armature windings 5 are wound. Bearings 13 and 14 fixed to the frames 1 and 2 rotatably support a shaft 9 to which a rotor core 6 is fixed within the inner periphery of, the stator core 3. A field coil 10 is wound around the rotor core 6 while, on the other hand, cooling fans 11 and 12 are disposed on both end surfaces of pole cores 7 and 8. A voltage regulator 18 having an exciting current controlling device 19 (FIG. 1) built therein is mounted on the outside of the rear frame 2.

Next, the circuit construction of the on-vehicle a.c. generator of this embodiment will be explained with reference to FIG. 1.

The voltage regulator 18 is composed of a three-phase full-wave rectifier 19 and a voltage regulation section 20. The three-phase full-wave rectifier 19 is composed of an N-channel enhancement mode type of MOS power transistors 19a to 19f each made using a monocrystal SiC (6H-SiC) as a base material. The transistors 19a to 19c on the high side make individual connections between respective phase output terminals of the three-phase armature windings 5 and the high voltage terminal of a battery 21 while, on the other hand, the transistors 19d to 19f on the low side make individual connections between the respective output terminals of the three-phase armature windings 5 and the low voltage terminal of the battery 21.

The voltage regulation section 20 is composed of a controller 20aa switching transistor (exciting current controlling transistor) 20b and a flywheel diode 20c. The controller 20a makes PWM control of the switching transistor 20b according to a battery voltage $V_B$. The exciting current supplied from the battery 21 to the field winding 10 through a brush 16 and a slip ring 17 (FIG. 2) is controlled by operation of this switching transistor 20b. The switching transistor 20b is formed using a monocrystalline SiC (6H-SiC) as a base material.

The voltage control operation of the voltage regulation section 20 will now be explained briefly. When the rotor core 6 is rotated by an engine (not illustrated) and the controller 20a of the voltage regulator 18 reads the battery voltage $V_B$ and thereby provides on/off control of the exciting current controlling transistor 20b within a range of the rate of change of the exciting current (or the duty ratio of the exciting current controlling transistor 20b) having a prescribed, or smaller than prescribed, value as described later, three-phase a.c. voltages are induced to occur in the three-phase armature windings 5, whereby a direct current full-wave rectified by the three-phase full-wave rectifier 19 charges the battery 20 or is consumed by the on-invehicle electrical load or the like. Also, the cooling fans 11 and 12 are rotated to thereby cool the field coil 10, three-phase armature windings 5, voltage regulator 18, etc.

Next, an example of the on/off control of respective MOS power transistors 19a to 19f of the three-phase full-wave rectifier 19 through the operation of the controller 20a will be explained.

The controller 20a reads respective phase generated voltages Vu, Vv and Vw which are potentials at the output terminals in respective phases of the three-phase armature windings 5 and selects from among the interphase generated voltages Vu-Vv, Vu-Vw, Vv-Vu, Vv-Vw, Vw-Vu and Vw-Vv one which has the greatest positive value and is higher than the terminal voltage of the battery 21. Then, it makes one MOS power transistor of the high side MOS power transistors 19a to 19c and one MOS power transistor of the low side MOS power transistors 19d to 19f, respectively, "on", so that this selected interphase generated voltage may be applied to the battery 21. As a result of this, charging current is supplied from the selected three-phase armature winding to the battery 21.

The controller 20a detects the battery voltage $V_B$, compares this battery voltage $V_B$ with a preset reference voltage and, according to whether or not the battery voltage is higher than the latter, performs on/off control of the exciting current to thereby maintain the terminal voltage of the battery 21 to be at a target level.

Figure 3:
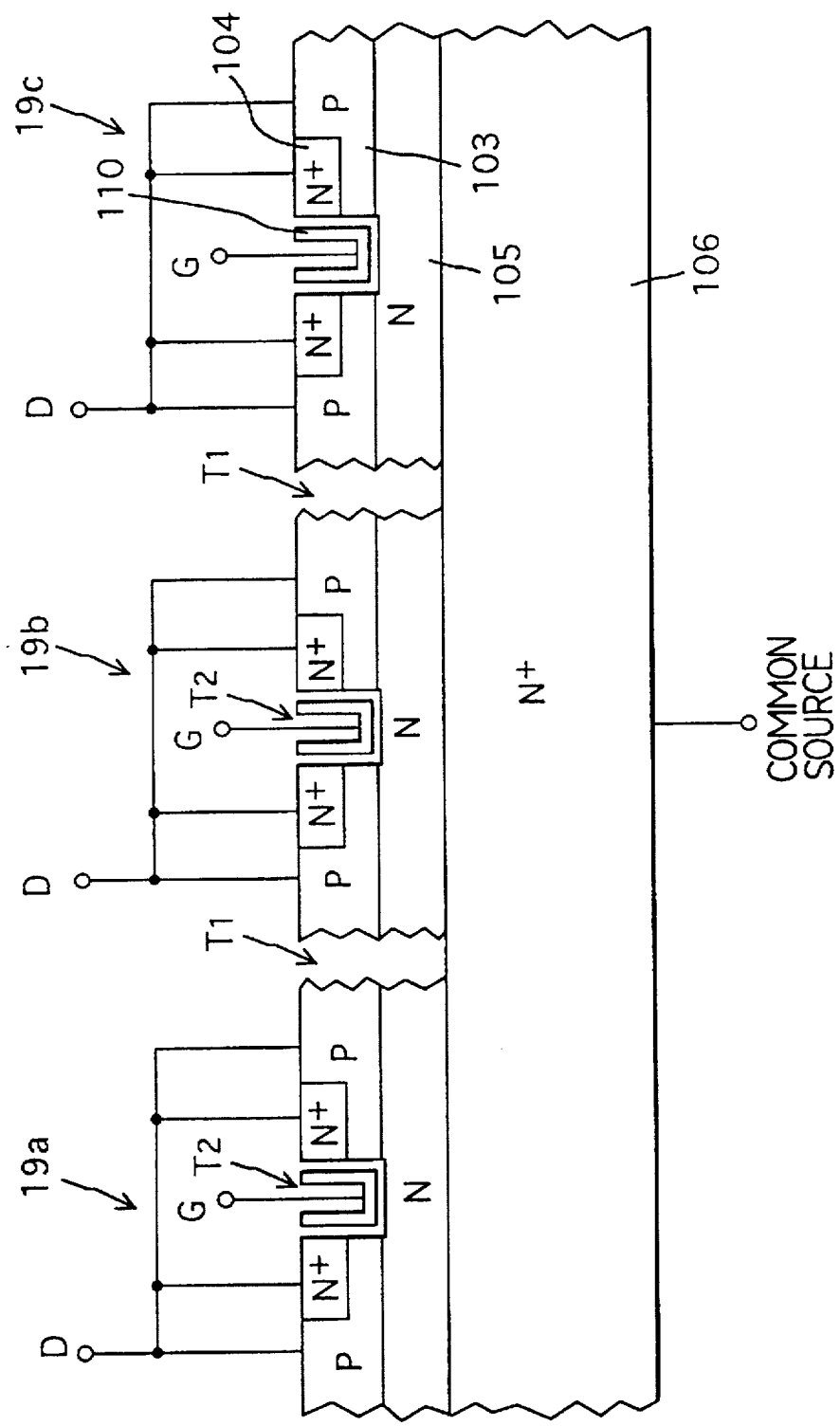
FIG. 3 is a sectional view illustrating a MOS power transistor on the high side of the three-phase full-wave rectifier of FIG. 1.
Figure 4:
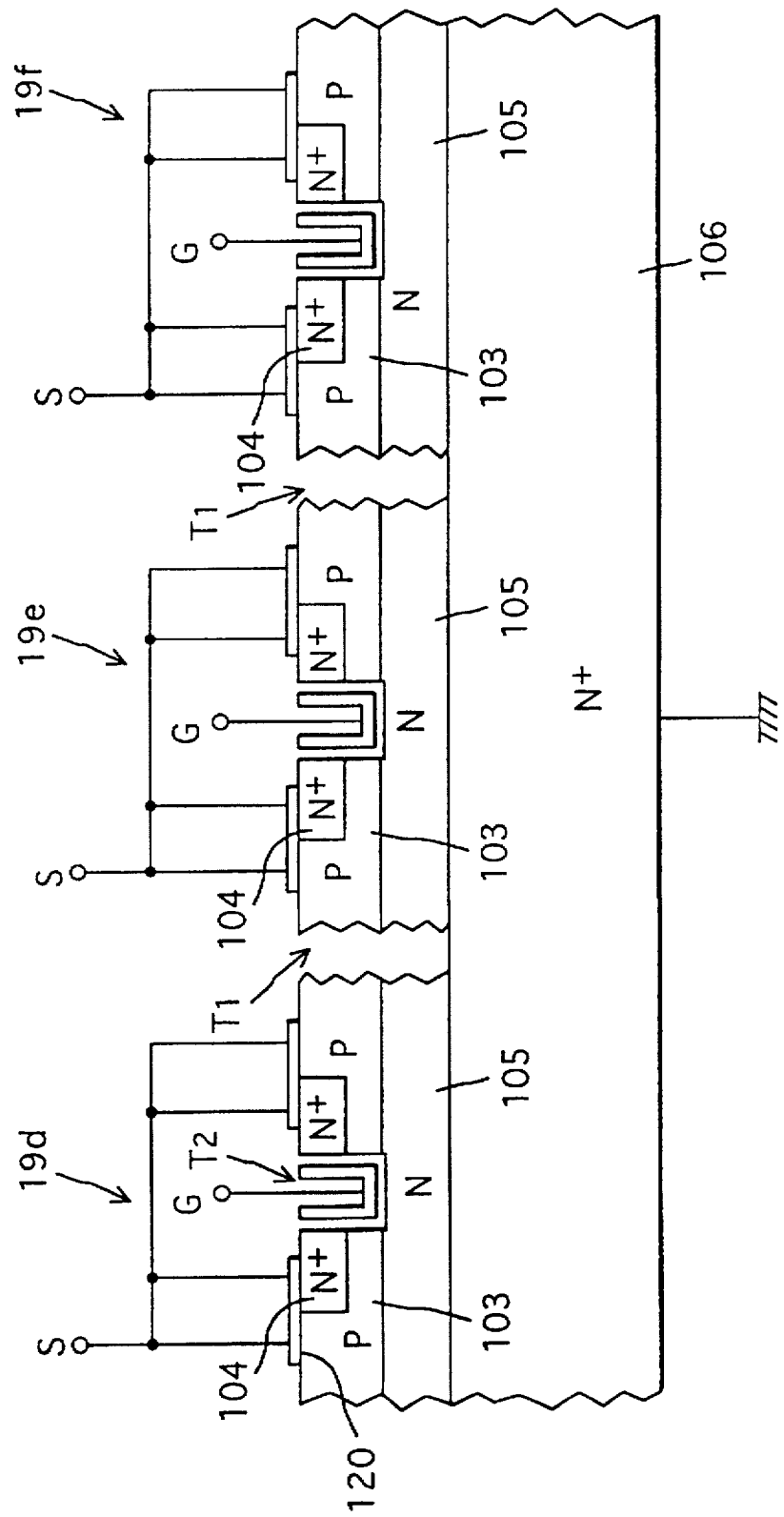
FIG. 4 is a sectional view illustrating a MOS power transistor on the low side of the three-phase full-wave rectifier of FIG. 1.

Details of the above-mentioned N-channel MOS power transistor type three-phase full-wave rectifier and switching transistor 20b made using monocrystalline 6H-SiC will further be explained hereunder with reference to FIG. 3. FIG. 3 illustrates a sectional structure of the N-channel MOS power transistors 19a to 19c and FIG. 4 illustrates a sectional structure of the MOS power transistors 19d to 19f. Although not illustrated, the sectional structure of the switching transistor 20b is the same as that of one of the switching transistors illustrated in FIG. 3 and the switching transistor 20b is constructed as a separate chip, provided, however, that the substrate is used as the drain region.

The respective MOS power transistors 19a to 19f of the three-phase full-wave rectifier 19 are sequentially on/off operated by the controller 20a to thereby perform three-phase full-wave rectification with respect to the exciting current.

The reference numeral represents a high resistance element for applying potential to a P-type well region right beneath the gate electrode of each of the MOS power transistors 19d to 19f, which element has a resistance value of 150 ohms or more. A parasitic diode Dd on the drain (D) connection side of each of the high side MOS power transistors 19a to 19c is shortcircuited while, on the other hand, the high resistance element 120 of each of the low side MOS power transistors 19d to 19f is connected in parallel with a parasitic diode Ds on the source (S) connection side thereof.

If connection is made as mentioned above, the common source S of the high side MOS power transistors 19a to 19c can have a voltage-resisting layer 105 between itself and the P-type well region 103, with the result that the high side MOS power transistors 19a to 19c can be integrated on the same chip as illustrated in FIG. 3. Similarly, since the common drain D of the low side MOS power transistors 19d to 19f can have a voltage-resisting layer 105 between itself and the P-type well region 103, these low side MOS power transistors 19d to 19f can be integrated on the same chip as illustrated in FIG. 4. The power loss and generated heat of the MOS power transistors 19a to 19f and switching transistor 20b can be greatly decreased by adopting the SiC-MOS transistors, as understood from the foregoing explanation.

In FIG. 3 the reference numeral 103 denotes the P-type well region, 104 denotes an $N^+$ type drain region, 105 denotes the N-type voltage-resisting layer and 106 denotes the $N^+$ type substrate (common source region). Also, in FIG. 4, the reference numeral 103 denotes the P-type well region, 104 denotes an $N^+$ type source region, 105 denotes the N-type voltage-resisting layer and 106 denotes the $N^+$ type substrate (common drain region).

Next, the manufacturing method for the MOS power transistors 19a to 19f and switching transistor 20b according to this embodiment will be explained.

The N-type voltage-resisting layer 105 is formed on the $N^+$ type substrate 106 made using a 6H-SiC material through epitaxial growth, the P-type well region 103 is formed on the surface portion of the N-type voltage-resisting layer 105 through epitaxial growth, and further the $N^+$ type region 104 is formed in the surface portion of the P-type well region 103 through ion implantation of nitrogen. Then, by means of deep trenches T1 extending down to the substrate 106, the respective MOS transistors are separated from each other and, by means of shallow trenches T2 extending down to the N-type voltage-resisting layer 105, gate electrode formation grooves are formed. Thereafter, gate insulation films each consisting of a silicon oxide film are formed on the surfaces of the trenches T2 through thermal oxidation. Thereafter, gate electrodes 110 each consisting of a doped polysilicon are formed in the trenches T2. The high resistance element 120 is formed by depositing a low-concentration polysilicon layer on an insulative film (not illustrated) in such a manner as to contact with the P-type well region 103 and $N^+$ type region 104.

Figure 7:
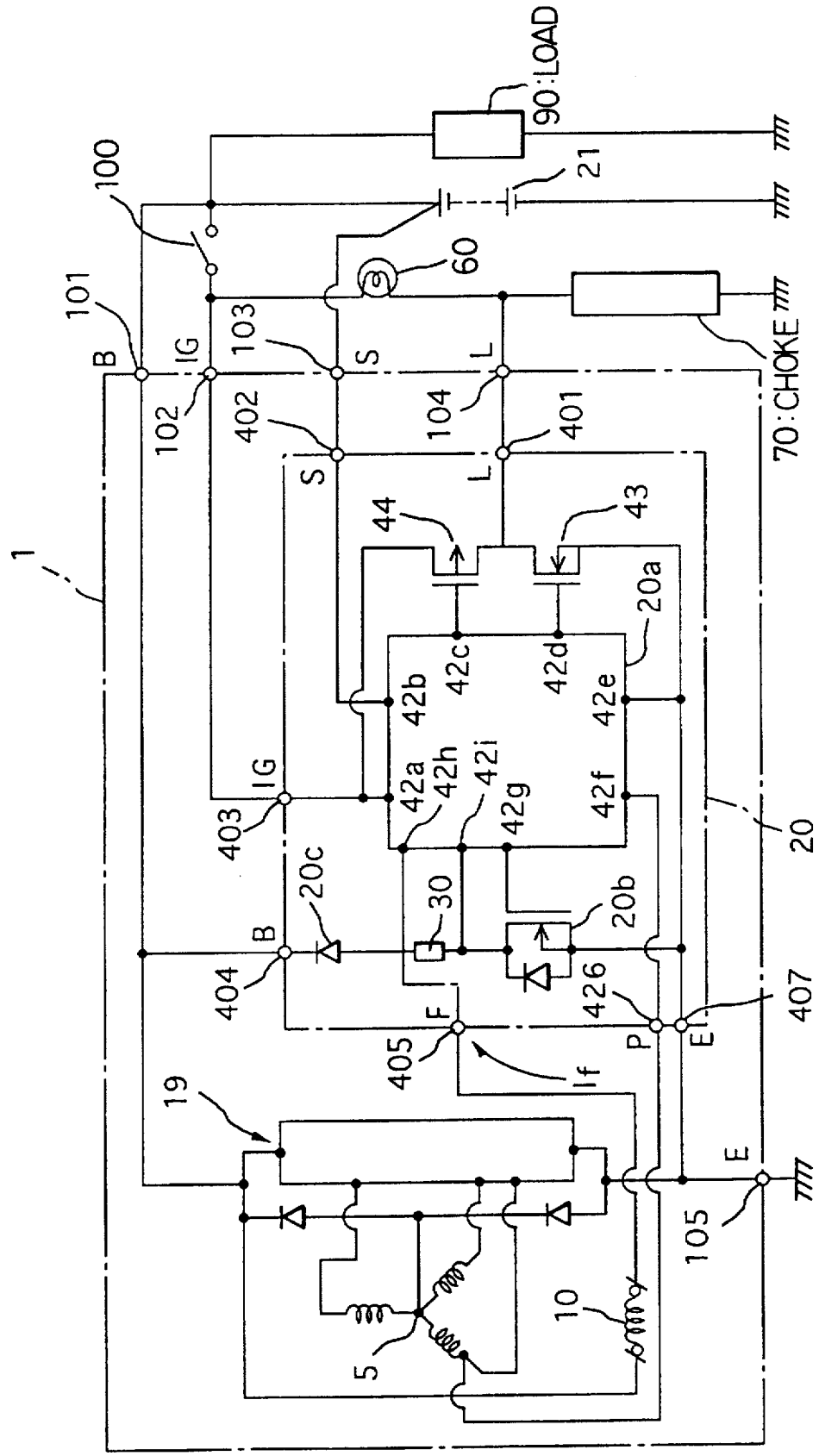
FIG. 7 is a more detailed circuit diagram illustrating the on-vehicle a.c. generator of FIG. 1.

A resistor 30 illustrated in FIG. 7 is a low resistance element for detecting the exciting current and is disposed between the drain of the exciting current controlling transistor 20b and the field coil 10. The controller 20a can detect the exciting current If by a potential difference $\Delta V$ between the both ends of the resistor 30.

Next, an example of the theoretical calculations performed of respective various kinds of performances of the Si-bipolar power transistor, Si-MOS power transistor and SiC-MOS power transistor manufactured with the same chip size and same design rule is shown in Table 1.

These calculations were performed with regard to a series circuit of the field (exciting) coil 10 and MOS power transistor 20b on the assumption that the chip areas of the respective elements be equal (here 16 mm$^2$) and the design rules for the both MOS power transistors be prepared under the same conditions.

Here, the exciting coil 10 is assumed to have a resistance value of 2.9 ohms. The on-resistance of the switching transistor 20b is set to be 270 ohms in case of the Si-bipolar transistor 20b, 350 ohms in case of the Si-MOS power transistor and 14 ohms in case of the SiC-MOS power transistor.

Figure 5:
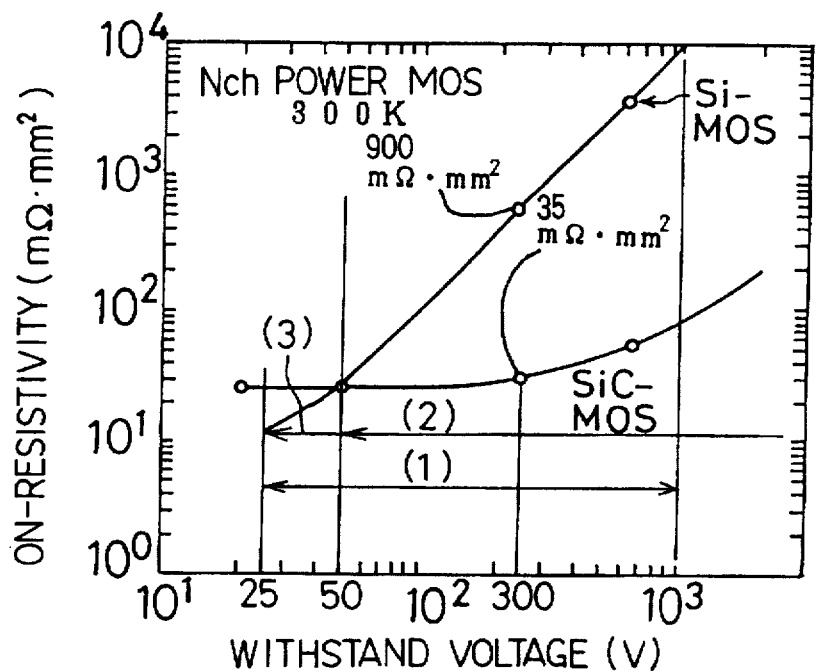
FIG. 5 illustrates the relationship between the withstand voltage of SiC and SiMOS power transistors and the channel resistance.

The 270 ohms corresponding to the Si-bipolar power transistor (bipolar T) is an actual measured value while, on the other hand, the 350 ohms corresponding to the Si-MOS power transistor and 14 ohms corresponding to the SiC-MOS power transistor are calculated values which have been calculated from the values (900 m$\Omega\cdot$mm$^2$ in case of Si and 35 m $\Omega\cdot$mm$^2$ in case of SiC) of the on-resistivity at a withstand voltage of 300 V in FIG. 5.

TABLE 1

| | Voltage B 14 V Field Winding Resistance 2.9 $\Omega$ | | | | |
|---|---|---|---|---|---|
| | ON-Resistance (m$\Omega$) | Voltage Drop VS(V) | Field Winding Voltage VF(V) | Field Current IF(A) | Loss(w) VS × IF |
| Bipolar Transistor | 270 | 1.2 | 13.8 | 4.4 | 5.3 |
| Si MOS FET | 350 | 1.5 | 13.5 | 4.3 | 6.5 |
| SiC MOS FET | 14 | 0.07 | 14.93 | 4.8 | 0.34 |

It is proved from these calculation results that the calculation loss corresponding to the SiC switching transistor 20b is as very small as 340 mW and this loss can be decreased remarkably compared with the calculation loss W corresponding to the Si switching transistor 20b.

Additionally, FIG. 5 shows the relationship between the withstand voltage and the on-resistivity which is determined by calculations wherein it is assumed that the withstand voltage be withstood substantially totally by the N-type withstand voltage layer. While this on-resistivity is the sum of the channel resistance and the resistance of the N-type voltage-resisting layer 105, as seen from FIG. 5 the resistance of the N-type voltage-resisting layer 105 is predominant in the high withstand voltage use of Si-MOST although the channel resistance fluctuates due to various factors. It is to be noted in FIG. 5 that (1), (2) and (3) indicate respectively a range of withstand voltage set for a current element of the on-vehicle a.c. generator, a range in which the SiC element is made advantageous and a range in which the Si element is more advantageous.

(Further analyses on the relationship between the withstand voltage and the resistance value of the Si-MOS power transistor and SiC-MOS power transistor)

While the MOS power transistors 19a to 19f of the abovementioned embodiment are made using 6H-SiC as a base material and designed to have a withstand voltage of 250V, the analyzed results (see FIG. 5) of the respective resistance values of the three-phase full-wave rectifier 19 for on-vehicle a.c. generator using this 6H-SiC MOS power transistors 19a to 19f and the three-phase full-wave rectifier 19 using the Si-MOS power transistor will now be theoretically explained, provided, however, that here the channel resistance increase effect resulting from the feedback effect of the source-parasitic resistor Rs is ignored and that the circuit construction is of a vertical type and the chip area is equal.

The resistance R of the transistor is the sum of the channel resistance rc and the resistance rb of the $N^+$ type voltage-resisting layer 105. Assuming that:

$$rc=L/W\cdot(1/\mu s\cdot es\cdot eo)^{-1}\cdot(Tox/(Vg-Vt))$$

$$rb=4Vb^2\cdot(1/\mu\cdot es\cdot eo\ Ec\cdot A),$$

the SiC-MOS power transistor has a resistance value which is approximately 1/15 of that of the Si-MOS power transistor, provided, however, that the breakdown field intensity Ec is $3\times10^5$ in case of Si and $3\times10^6$ V/cm in case of SiC; the dielectric constant es is 11.8 in case of Si and 10.0 in case of SiC; and the area A is 1 mm$^2$ in case of both Si and SiC. Vb representing the breakdown voltage (withstand voltage).

Further, $\mu$ represents the bulk mobility of electron and is 1100 in case of Si and 370 cm$^2$/V·S) in case of SiC, the channel length L is 1 $\mu$m in each case, the channel width is 22.2 cm in each case, and s represents the channel mobility of electron and is 500 in case of Si and 100 cm$^2$/(V·S) in case of SiC.

It is understood from the above equations that in a range wherein the withstand voltage is 50 V or more, SiC has a smaller resistance value. Since in the above calculations the substrate is made to be drain, in a case where the substrate is made to be source, the resistance of Si must remarkably increase due to the channel resistance increase resulting from the above-explained feedback effect of the source-parasitic resistor Rs resistance.

Accordingly, even when the design rule is somewhat changed, in a range of the withstand voltage being 100 V or more, it can be estimated that the SiC made MOS power transistor becomes low in resistance without fail.

Figure 6:
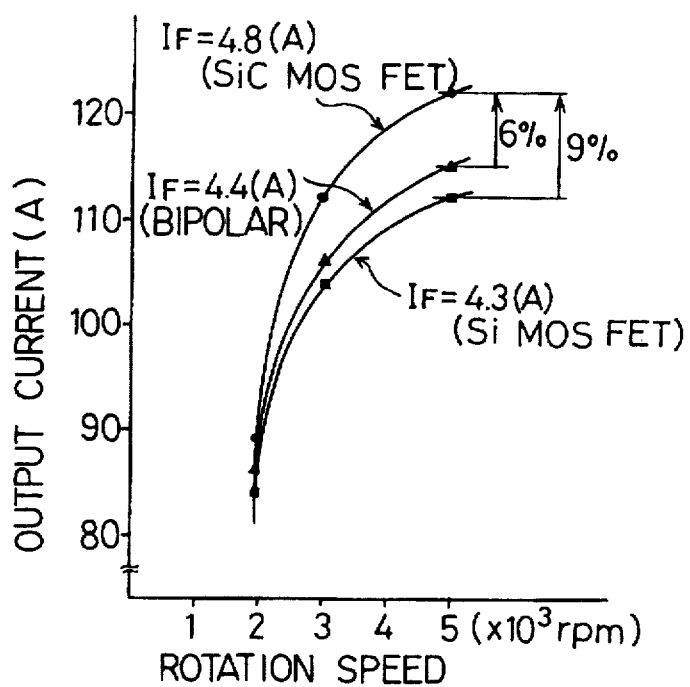
FIG. 6 is an actually measured characteristic curve diagram illustrating the relationship between the rotation speed and the output current of on-vehicle a.c. generators wherein there are incorporated switching transistors made using SiC-MOST of the present embodiment, and conventional Si-BPT and Si-MOST.

Next, the actual measured results of the relationship between the generator rotation speed and output current of each of the on-vehicle a.c. generators which use the switching transistors 20b consisting respectively of Si-MOST, Si-BPT and SiC-MOST manufactured with the same design rule and the same chip area are illustrated in FIG. 6. It could be proven from FIG. 6 that an increase in the output current can be realized.

In the above-mentioned embodiment, although the low side MOS power transistors 19d to 19f of the three-phase full-wave rectifier 19 and the switching transistor 20b is integrated, it is also possible, due to a decrease in the generated heat, to integrate the switching transistor 20b and the controller 20a integrally, or to integrate the MOS power transistors 19d to 19f, switching transistor 20b and controller 20a integrally.

Because it is preferable that the three-phase full-wave rectifier be formed into a MOS power transistor or MOS-SIT structure, it is advantageous that the controller 20a be also formed into the same elemental structure. As such, it is possible to omit the connection wiring between the low side MOS power transistors 19d to 19f and the controller 20a and also possible to decrease the electromagnetic radiation noise from this connection wiring.

The circuit diagram of the entire on-vehicle a.c. generator according to this embodiment will now be explained with reference to FIG. 7. The exciting current controlling switching transistor 20b constitutes the voltage regulator 20 along with the controller 20a diode 20c and exciting current detecting resistor 30 and is loaded on the same substrate to form a hybrid IC. The circuit of FIG. 7 will be explained hereunder. Although in this embodiment the exciting current If is detected by the potential difference between the ends of the resistor 30 of low resistance directly connected in series to the drain side of the exciting current controlling transistor 20b it is also possible to detect the exciting current If by the source-drain potential difference (=conduction current x resistance (substantially fixed if the gate voltage is fixed)) of the exciting current controlling transistor 20b kept in an "on" state, i.e. in this embodiment the drain potential thereof.

Reference numeral 1 denotes the on-vehicle a.c. generator, 101 (i.e. B) denotes an output terminal, 102 (i.e. IG) denotes an IG terminal, 103 (i.e. S) denotes a B voltage input terminal, 104 (i.e. L) denotes a charge lamp driving terminal, and 105 (i.e. E) denotes a ground terminal. The generator 1 is composed of the armature windings 5, field winding 10, voltage regulator (hereinafter, voltage regulator) 20 and rectifier (see FIG. 1) 19. The voltage regulator 20 comprises terminals including a charge lamp driving terminal 401 (i.e. L), battery voltage detecting terminal 402 (i.e. S), IG terminal 403 (i.e. IG), +B terminal 404 (i.e. B), field winding terminal 405 (i.e. F), phase voltage input terminal of the armature windings 406 (i.e. P) and ground terminal 407 (i.e. E), the voltage regulator 20 further comprising a flywheel diode 20c, exciting current controlling switching transistor 20b consisting of MOSFET made using a SiC material, controller 20a charge lamp driving transistor (SiC-MOS FET) 44 and electrothermal choke driving transistor (SiC MOSFET) 43. Numeral 60 denotes a charge lamp, 70 denotes an electrothermal choke, 90 denotes an electrical load and 100 denotes an IG switch.

The field current control function of the controller 20a of FIG. 7 other than the on/off control function thereof with respect to the rectifying transistors 19a to 19f of the three-phase full-wave rectifier 19 will now be explained with reference to the functional block diagram of FIG. 8.

Reference numeral 42a denotes an IG input terminal, 40b denotes a battery voltage sensing terminal, 40c denotes an electrothermal choke driving transistor driving terminal, 42d denotes a charge lamp driving transistor driving terminal, 42e denotes a ground terminal, 42f denotes a phase voltage input terminal of the armature windings, and 42g denotes an exciting current controlling transistor driving terminal.

The reference numeral 421 denotes a controller driving power source. Numeral 422 denotes a voltage generation detecting comparator wherein the phase voltage of the armature windings is input from a (−) terminal and a reference voltage Vref1 enabling detection of start or non-start of the voltage generation is input from a (+) terminal. When the phase voltage is lower than the reference voltage Verf1, it is determined that the voltage generation is not started, whereby the comparator 422 outputs a Hi signal, turns the transistor 44 off and turns the transistor 43 on, and lights up the charge lamp 60. Conversely, when the phase voltage rises whereby it is confirmed that voltage generation has been started, the comparator 422 outputs a Lo signal, turns the transistor 43 off and turns the transistor 44 on, and supplies power to the choke 70.

A comparator 424 controls the exciting current controlling transistor according to the battery voltage and inputs a voltage corresponding to the battery voltage from a (−) terminal thereof and a voltage Verf2 corresponding to a control target voltage for the battery 21 from a (+) terminal thereof. When the battery voltage is lower than the target voltage Verf2, the output of the comparator 424 becomes Hi while, on the other hand, when the battery voltage is higher than the target voltage Verf2, the output thereof becomes Lo.

The reference numeral 426 represents an increase rate limiting circuit portion (exciting current incrementing means) for limiting a rate of increase or average rate of increase in the duty ratio signal (conduction rate) S input from the comparator 424 to a prescribed, or smaller than prescribed, value. Instead of limiting a rate of increase or average rate of increase in the input duty ratio signal (conduction rate) S, the increase rate limiting circuit portion (exciting current incrementing means) 426 may be a circuit which, when the duty ratio signal (conduction rate) S input from the comparator 424 is a present maximum duty ratio Snmax or below, outputs the duty ratio signal S and, when it is above the present maximum duty ratio Snmax, inhibits outputting of it.

Figure 8:
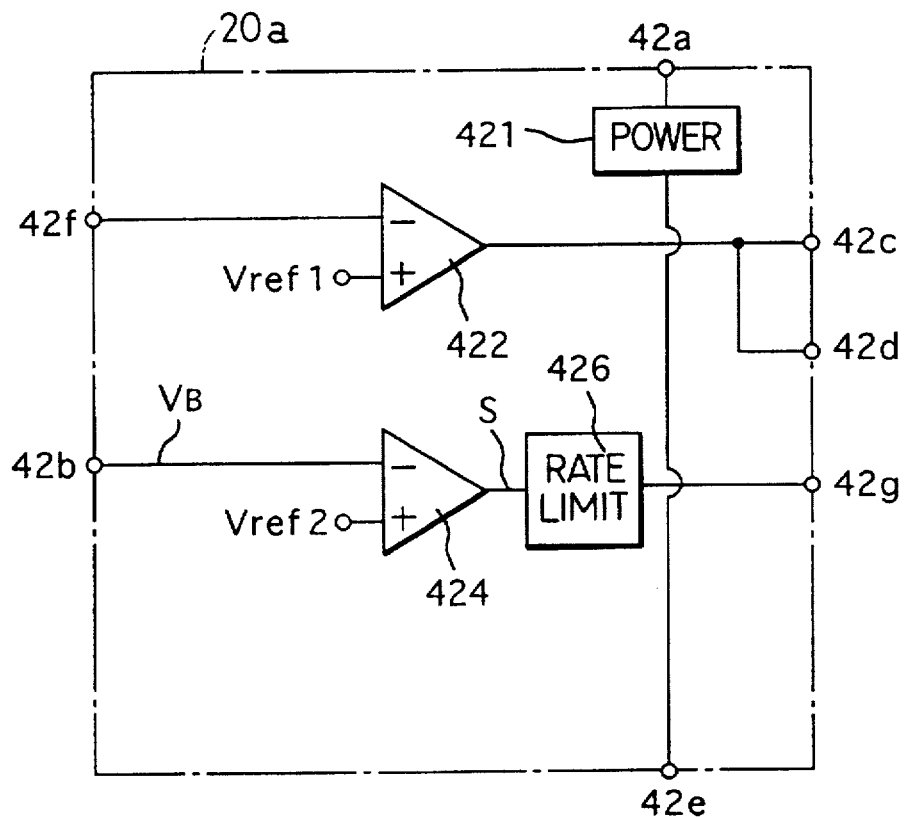
FIG. 8 is a circuit diagram illustrating part of the circuit of FIG. 7 in an embodied form.
Figure 9:
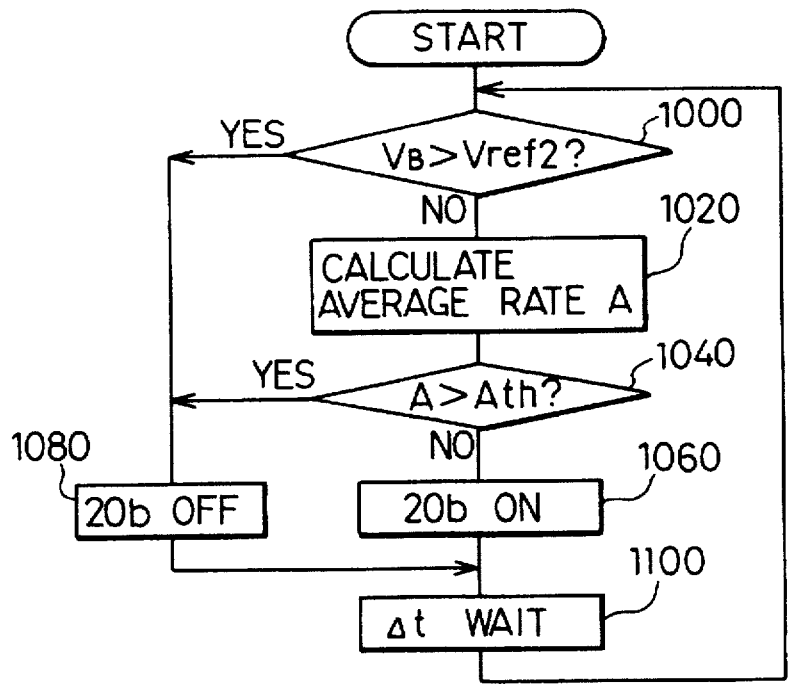
FIG. 9 is a flow chart illustrating a software version of the circuit of FIG. 8.

FIG. 9 is a flow chart provided for performing the function of circuits 424 and 426 of FIG. 8 in the form of a microcomputer software.

First, it is examined whether or not the battery voltage $V_B$ is higher than the target voltage Verf2 (step 100) and, when the battery voltage $V_B$ is higher, the exciting current controlling transistor 20b is made "off", whereby the operation returns to step 1000. When the batter voltage $V_B$ is not higher, calculation is performed of an average rate A of increase in the immediately previous duty ratio (step 1020), whereby it is examined whether or not this average rate A of increase exceeds a prescribed threshold value (a maximum rate of increase in the duty ratio) at step 1020. When the average rate A of increase exceeds the prescribed threshhold, the operation proceeds to step 1080 and when it does not, the exciting current controlling transistor 20b is thread "on". Then, in order to follow the routine cycle speed, the operation waits a prescribed short period of time Δt (step 1100) and returns to step 1000.

That is, according to the circuit and program of FIGS. 8 and 9, the rate of increase in the duty ratio (or the rate of increase in the exciting current) is limited to a prescribed, or lower than prescribed, level, whereby it is possible to suppress decrease in or unstability of the engine rotation speed.

Figure 10:
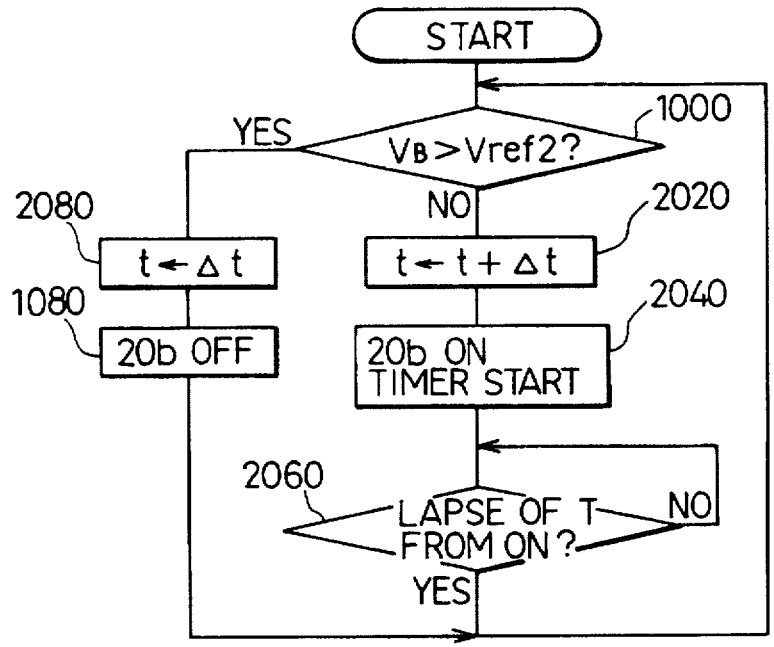
FIG. 10 is another flow chart illustrating a software version of the circuit of FIG. 8.

FIG. 10 is a flow chart illustrating another routine having the same function as that of the flow chart of FIG. 9. First, it is examined whether or not the battery voltage $V_B$ is higher than the goal voltage Verf2 (step 1000). When the batter voltage $V_B$ is higher, the set delay time period t of the timer is reset to a prescribed short time period $\Delta t$, whereupon the exciting current controlling transistor 20b is made "off" and the operation returns to step 1000. When otherwise, the set delay time period t of the timer is prolonged to (t+$\Delta t$), whereupon the exciting current controlling transistor 20b is made "on" and simultaneously the counting of the timer is started (step 2040). Then, the operation waits until the timer set time is over (step 2060) and when the time has lapsed returns to step 1000.

Figure 11:
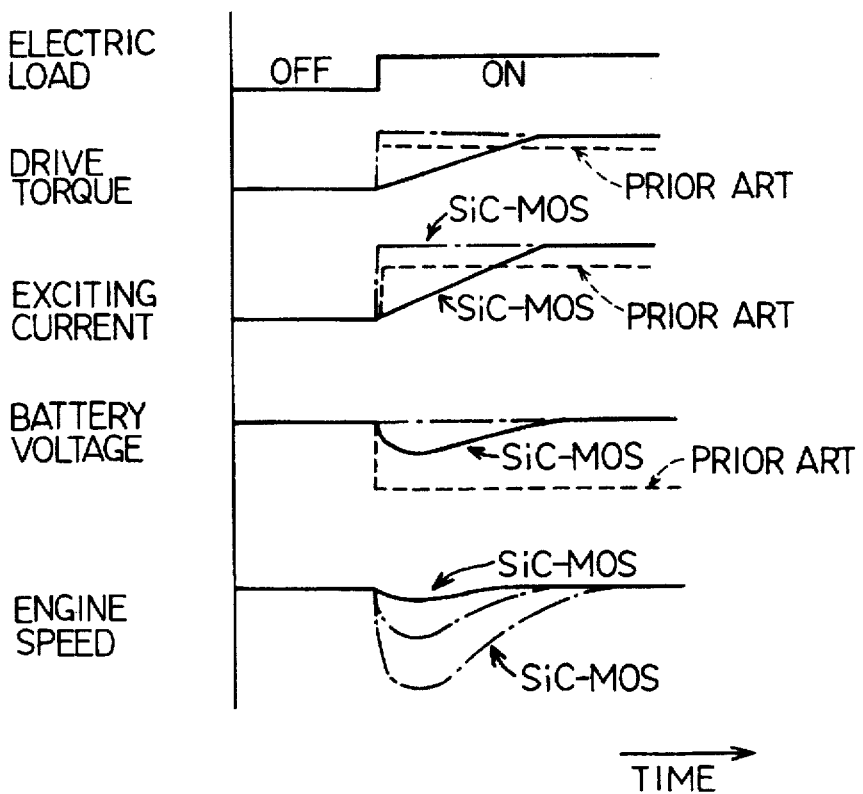
FIG. 11 is a timing chart illustrating variations in the amounts of state due to closure of an electrical load.

Respective variations in the generator driving torque (drive torque), exciting current, battery voltage and engine rotation speed when the large electrical load 90 is closed or switched on are illustrated in FIG. 11. The solid lines indicate the variations when limiting the rate of increase in the duty ratio in the case of this embodiment (in a case of using SiC-MOS transistors as the exciting current controlling transistor 20b and rectifying transistors 19a to 19f and gradually increasing the exciting current). The one-dot chain lines indicate the variations when not limiting the rate of increase in the duty ratio in the case of this embodiment. The dotted lines indicate the variations when not limiting the rate of increase in the duty ratio in the case of the prior art (in a case of using Si-MOS transistors as the exciting current controlling transistor 20b and rectifying transistors 19a to 19f).

Subsequently, the other advantages will now be stated.

As the advantages obtained from decreasing the on-resistance of the rectifying transistors 19a to 19f or exciting current controlling transistor 20b by using SiC-MOS transistors, first, the voltage drop thereof can be made small, and hence the loss can be suppressed to a small value, with the result that the efficiency can be increased and the generated heat can be suppressed. As a result miniaturization of the radiation fin can be achieved. Second, since the voltage drop can be made small, the voltage applied to the field winding 10 can be made high, with the result that the exciting current becomes large and therefore, an increase in the output power can be achieved. The results obtained from verification are as shown in Table 1 with regard to the abovementioned embodiment.

Figure 1:
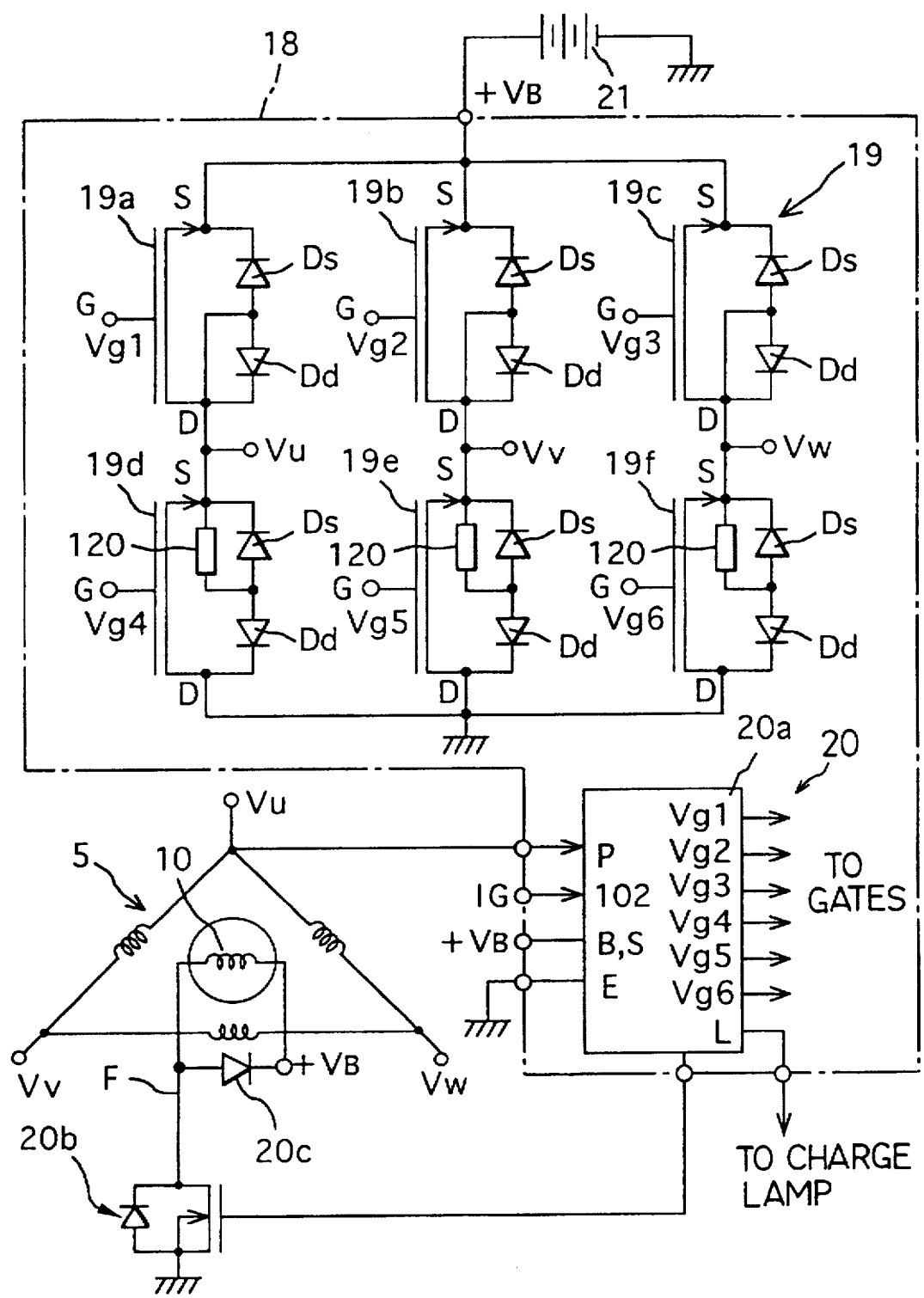
FIG. 1 is a circuit diagram illustrating an on-vehicle a.c. generator according to a first embodiment of the present invention.

In respect of Table 1, as illustrated in FIG. 1 or 7, the field winding 10 and the switching element 20b are connected in series with each other. Calculations were performed under the conditions that the voltage (+B) applied to both ends of the battery was 14 V, the resistance of the field winding 10 was 2.9 Ω, and concerning the on-resistance of the element 20b, using the presently employed 300 V withstand voltage element as a standard, the on-resistance thereof was 270 mΩ (the forward voltage drop: 1.2 V, actual measured value) in case of a bipolar transistor, was 350 mΩ (the forward voltage drop: 1.5 V, actual measured value) in case of Si-MOSFET and was 14 mΩ in case of SiC-MOSFET because under the conditions of 300 V withstand voltage the on-resistance thereof could be made to be approximately 1/25 of that of Si-MOSFET from the relationship in FIG. 5 between the withstand voltage and the on-resistance of each of Si and SiC. As a result, the on-resistance, voltage drop (Vs), field winding applied voltage ($V_F$), field current ($I_F$) and element loss (W) of each element are as shown in Table 1. It is understood that the exciting current the SiC-MOSFET element is improved 9% compared with the bipolar transistor and improved 12% compared with the Si MOSFET and also concerning the loss is decreased down to 1/6 and 1/19 in comparison with each of them. The increase in output, which is expected from an increase in the exciting current is as illustrated in FIG. 6, namely SiC-MOSFET can be increased approximately 6% compared with the bipolar transistor and approximately 9% compared with the Si-MOSFET.

The source-drain withstand voltage and source-gate withstand voltage of each of the rectifying transistors 19a to 19f and exciting current controlling transistor 20b are each made to be 100 V or more. In this high-withstand-voltage use, the SiC-MOS transistor enables procurement of the on-resistance which is much lower than that of the Si-MOS transistor having the same chip size.

(Second Embodiment)

Figure 12:
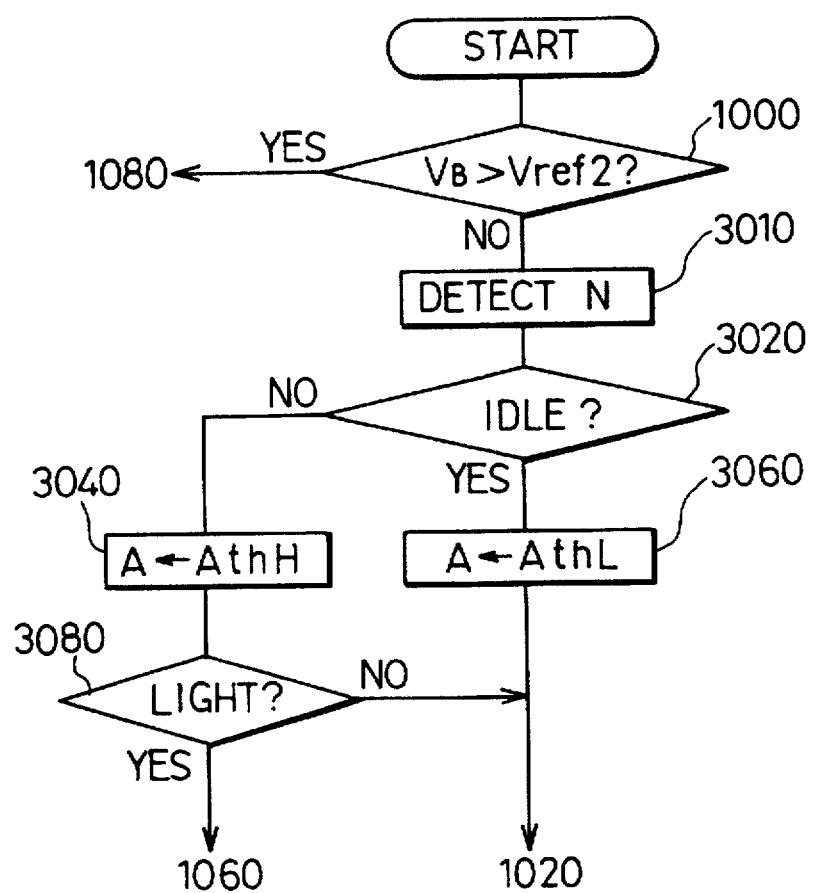
FIG. 12 is a flow chart illustrating the control operation according to a second embodiment of the present invention.

A second embodiment of the present invention will be explained hereunder with reference to a flow chart illustrated in FIG. 12.

This flow chart is inserted between steps 1000 and 1020 of the flow chart illustrated in FIG. 9.

First, if in step 1000 the battery voltage $V_B$ is not higher than the goal voltage Verf2, the operation reads the engine rotation speed N (step 3010). This N can be most readily determined by counting the frequency of the armature windings voltage. Thereafter, it is examined whether or not the engine rotation speed N is in a range of idle rotation (step 3020) and, if it is in a range of idle rotation, the threshold value Ath of the rate of increase in the duty ratio is set to be a prescribed low value AthL (step 3060), the operation proceeding to step 1020. If otherwise, the threshold value Ath of the rate of increase in the duty ratio is set to be a prescribed high value AthH (step 3040). Then, it is examined whether or not the headlight is lit up (step 3080). If if it is lit up, the operation proceeds to step 1060 and if it is out, the operation proceeds to step 1020.

Through the execution of the above operation, the rate of increase in the duty ratio (exciting current) during idle in which the adverse effect of a rapid increase in the engine load is great is limited more severely than in a range of other rotation. In addition, during travel (non-idle) and light-up, i.e. during overnight travel, limiting the rate of increase in the duty ratio is inhibited, whereby fluctuations in illumination of the heatlight can be prevented.

Figure 13:
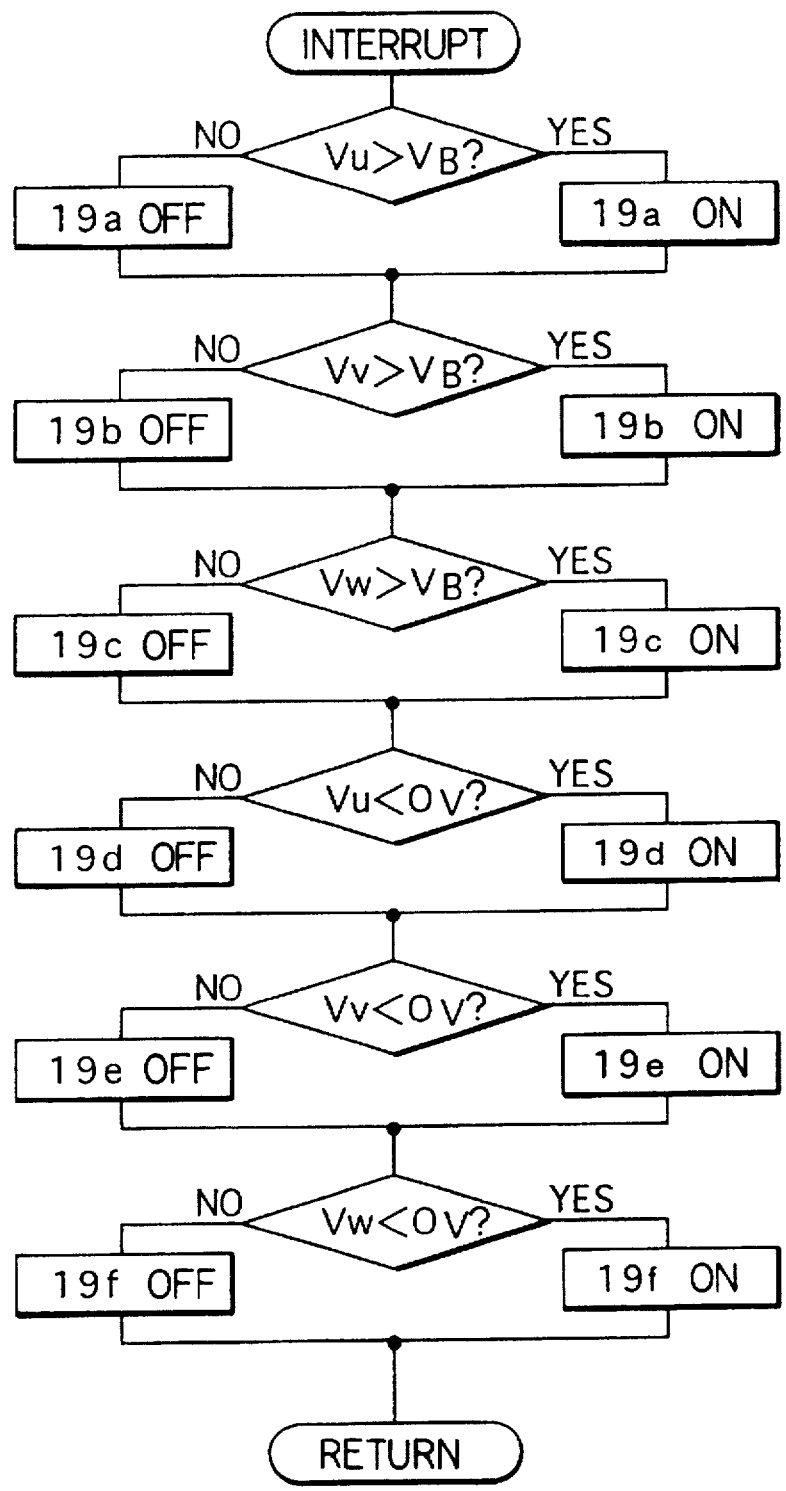
FIG. 13 illustrates an interruption subroutine (the drive control section of the rectifying means) for the control of the three-phase full-wave rectifier executed by a controller.

FIG. 13 illustrates an interruption subroutine (the drive control circuit of the rectifying means) for control of the three-phase full-wave rectifier 19 which is executed by the controller 20a. This routine is executed preferentially each time a prescribed period of time lapses. The routine per se is simple and therefore, explanation thereof is omitted for brevity, provided, however, that the "on" of the MOS power transistor 19a means making the voltage Vg1 high and thereby turning the MOS power transistor 19a "on" while, on the other hand, the "off" of the MOS power transistor 19a means making the voltage Vg1 low and thereby turning the MOS power transistor 19a "off". The same applies to each of the other steps.

(Third Embodiment)

Figure 14:
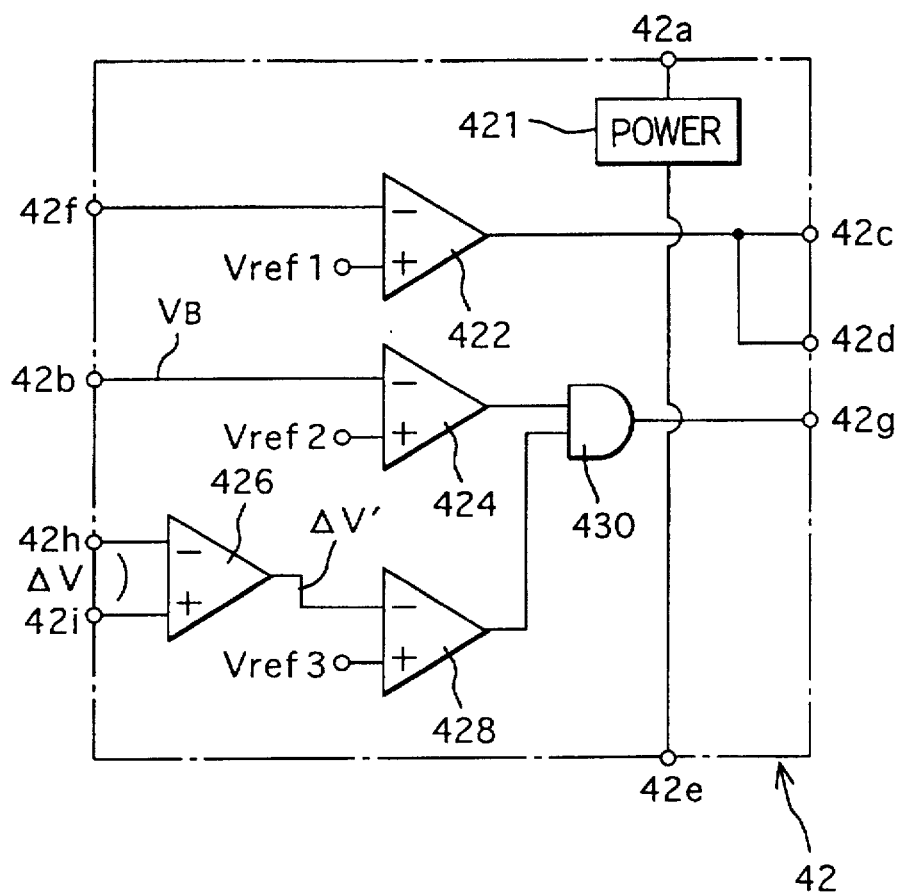
FIG. 14 is a circuit diagram illustrating a third embodiment of the present invention.
Figure 15:
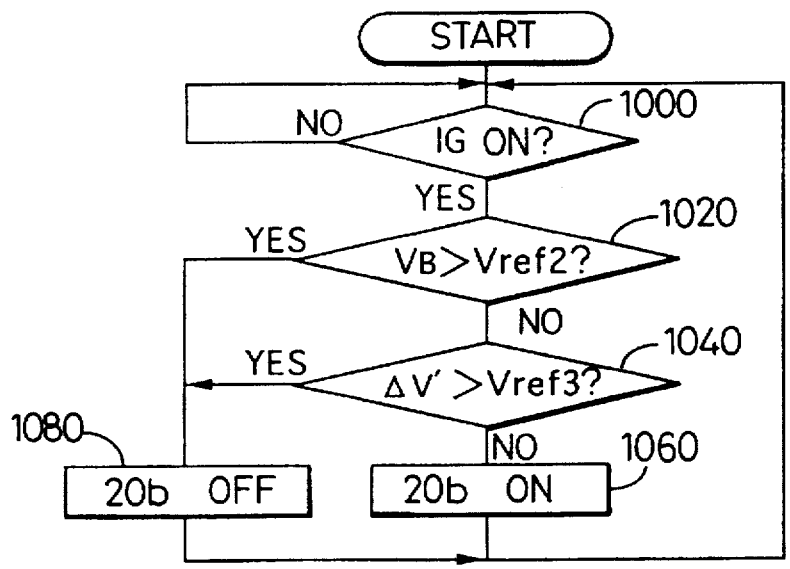
FIG. 15 is a flow chart illustrating a software version of the circuit of FIG. 14.

A third embodiment is a modification of the first embodiment (FIG. 8 in particular). In FIG. 14, the reference numeral 426 represents a differential amplifier which performs linear voltage amplification with respect to a minute potential difference $\Delta V$ between both ends of the low resistance element 30 and outputs the resulting signal to the (−) terminal of a comparator 428. The comparator 428 controls the operation of the exciting current controlling transistor 20b according to the magnitude of the exciting current and compares a voltage-amplified current signal voltage $\Delta V'$ with a prescribed threshold value Vref3. When the exciting current, i.e. current signal voltage ΔV' is lower than that corresponding to the threshold value Vref3, the output of the comparator 428 becomes Hi, whereby an AND circuit 430 applies the output voltage of a comparator 424 to the gate electrode of the exciting current controlling transistor 20b.On the other hand, when the exciting current, i.e. current signal voltage ΔV' is higher than that corresponding to the threshold value Vref3, the output of the comparator 428 becomes Lo, whereby the AND circuit 430 stops the output voltage of the comparator 424 from being applied to the gate electrode of the exciting current controlling transistor 20b. FIG. 15 is a flow chart provided for performing the function of the circuits 424, 426, 428 and 430 of FIG. 14 in the form of a microcomputer software.

That is, according to the circuits and program of FIGS. 14 and 15, there is adopted a construction wherein when the exciting current If reaches a prescribed maximum value (the value corresponding to Vref3), the exciting current is interrupted, that is, the transistor 20b is turned off. Therefore, the abovementioned disadvantages resulting from an excess current output can be avoided.

Subsequently, the other advantages will now be stated.

As the advantages obtained from decreasing the on-resistance of the rectifying transistors 19a to 19f or exciting current controlling transistor 20b by making it using SiC-MOS transistor, first, the voltage drop thereof can be made small, and hence, the loss can be suppressed to a small value. As a result that the efficiency can be increased and the generated heat can be suppressed and miniaturization of the radiation fin can be achieved. Second, since the voltage drop can be made small, the voltage applied to the field winding 10 can be made high, with the result that the exciting current becomes large and therefore an increase in the output power can be achieved. The results obtained from verification of the above are as shown in Table 1 which is shown in the above-mentioned embodiment.

Also, the threshold value voltage Vref3 illustrated in FIGS. 14 and 15 is made to be an exciting current value which when the temperature of the generator is a prescribed maximum permissible temperature (130° C.) permits generation of a rated maximum output. By setting as such, despite imposing a limitation on the exciting current for the purpose of limiting excess output at the time of the generator 1 being, for example, at a low temperature, no output shortage occurs in a low-output state, such as when the generator 1 is at an elevated temperature.

(Fourth Embodiment)

Figure 16:
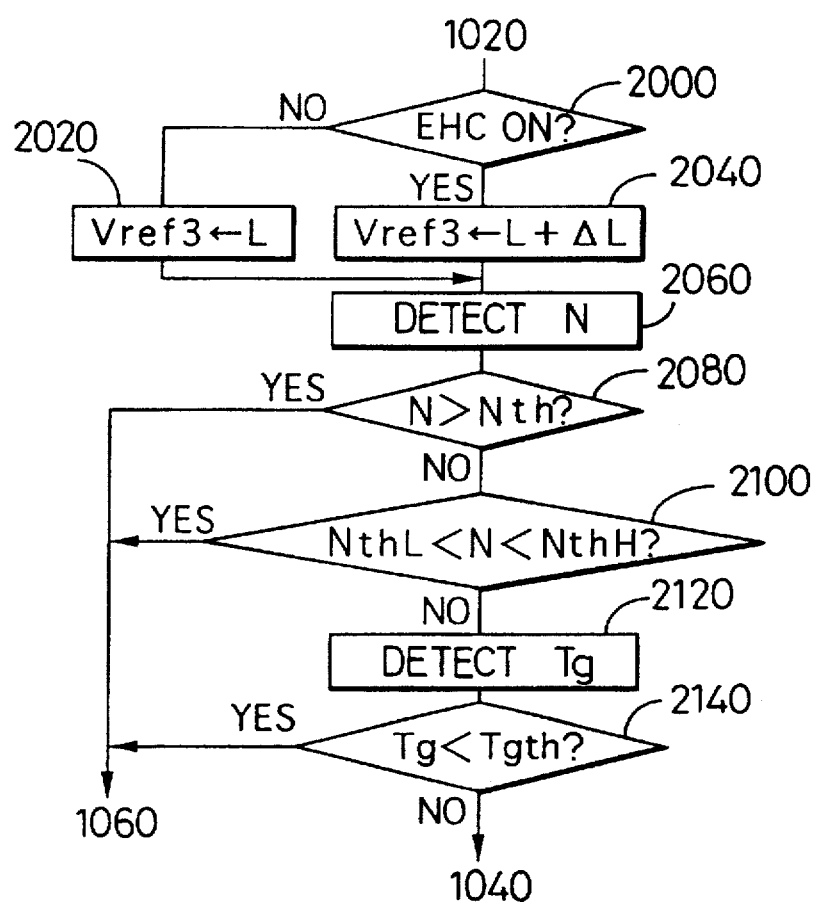
FIG. 16 is a flow chart illustrating the control operation according to a fourth embodiment of the present invention.

A fourth embodiment of the present invention will be explained hereunder with reference to a flow chart illustrated in FIG. 16.

This flow chart is inserted between steps 1020 and 1040 of FIG. 15.

First, it is examined whether or not a catalytic heater constituting the on-vehicle electrical load 90 has been turned "on" (step 2000). If it has not yet been turned "on", the threshold value voltage Vref3 is set to be an ordinary value L. If it has been turned "on", since the generator 1 needs to supply a large current, the threshold value voltage Vref3 is set to be a large value, i.e. a value obtained by adding a prescribed value ΔL to the ordinary value L.

Figure 17:
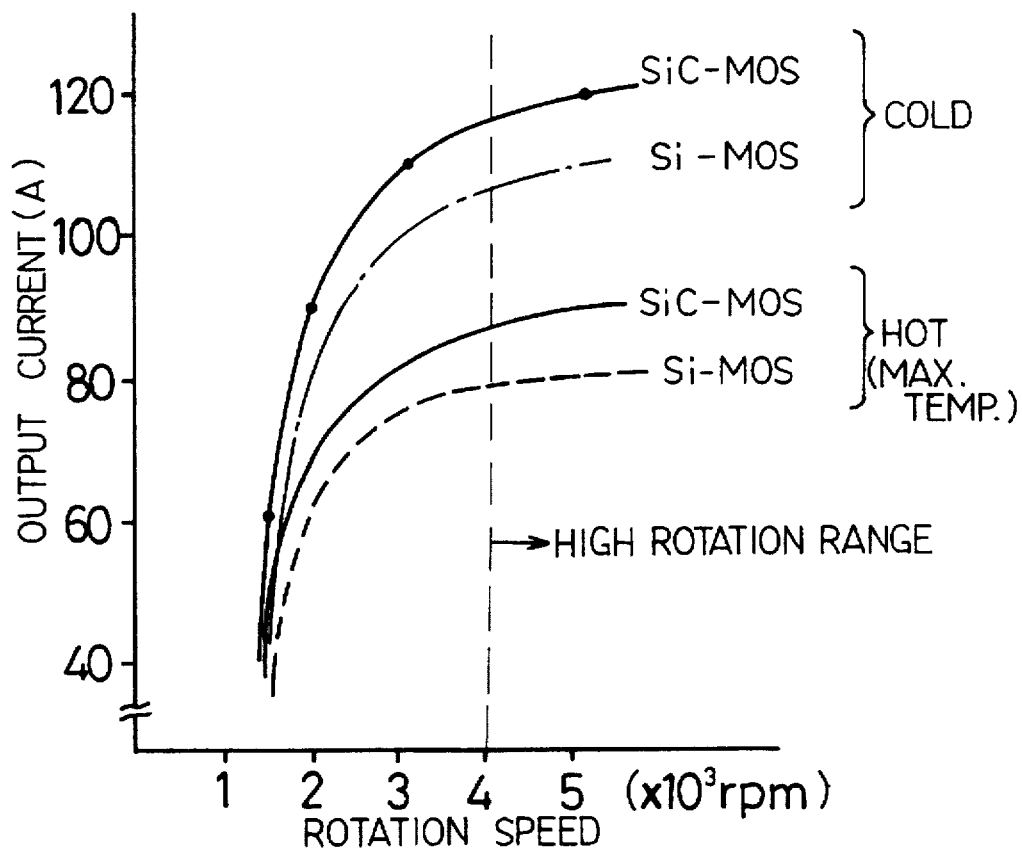
FIG. 17 is a characteristic curve diagram illustrating the relationship between the output current and rotation speed of a generator when the generator is cool and hot, in a case where a Si-MOS transistor or SiC-MOS transistor is adopted as the exciting current controlling transistor.
Figure 18:
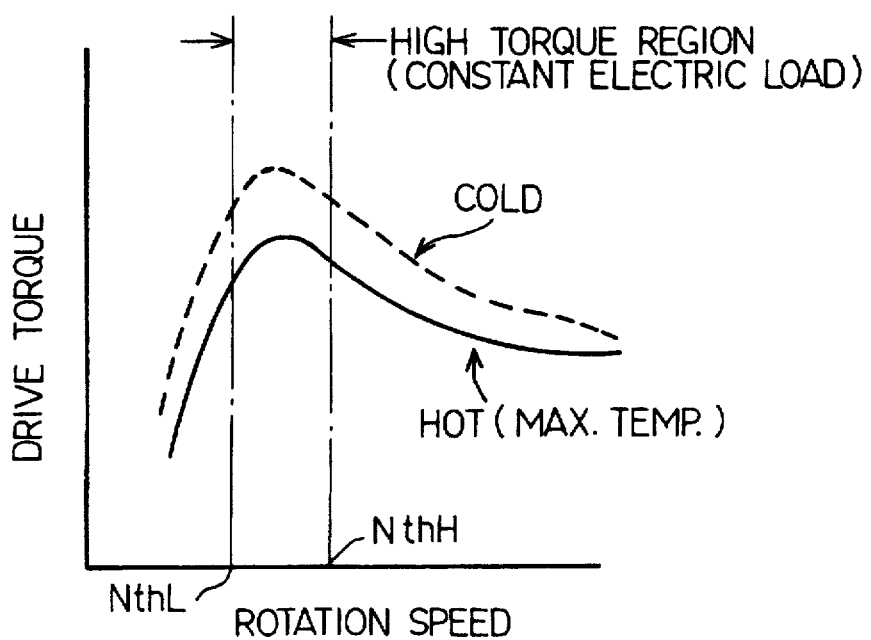
FIG. 18 is a characteristic curve diagram illustrating the relationship between the torque necessary for drive of a generator and the rotation speed thereof when the generator is cool and hot, in a case where a SiC-MOS transistor is adopted as the exciting current controlling transistor.

In the next step 2060, the operation detects the generator rotation speed N. The value N can be most readily determined by counting the frequency of the armature windings voltage. Then, it is examined at step 2080 whether or not the generator rotation speed N is in a high rotation range of its exceeding a prescribed rotation speed (4000 rpm or more) (208). If it is in a high rotation range, the operation proceeds to step 1060 and, if not, it is examined at step 2100 whether or not the generator rotation speed N is in a range of from a prescribed threshold rotation speed NthL to a prescribed threshold rotation speed NthH (the high load torque rotation range). As illustrated in FIG. 17, in the high rotation range, the maximum output current of the generator greatly increases and this tendency to increase is prominent particularly in case of SiC-MOS transistor. Also, as illustrated in FIG. 18, the high load torque rotation range is a generator rotation speed range which includes a generator rotation speed at which the drive torque of the generator applied to the engine becomes maximum when measured under test conditions that electrical load conditions including the battery are equal. If the generator rotation speed N is in this high load torque rotation range, the operation proceeds to step 1060. If otherwise, the operation detects the temperature Tg of the generator (step 2120). When desiring to detect it readily, since when making the exciting current controlling transistor 20b "on" for a prescribed short time period the temperature Tg becomes in approximation a function of this short time period and the exciting current corresponding thereto, it is sufficient to search the temperature Tg from a map in which the relationship thereamong is previously stored. Next, if the temperature Tg is a low temperature that is lower than a prescribed threshold value temperature Tgth, it is determined that the generator 1 is in a high output state, the operation proceeding to step 1060 in which limiting of the exciting current is performed. If otherwise, the operation proceeds to step 1040 in which exciting current limitation is not performed.

By performing the abovementioned operation, it is possible to limit the output (output current) more desirably.

The present invention should not be limited to the above-described embodiments but may be modified in various ways without departing from the spirit of the invention.

What is claimed is:

1. A control system for an a.c. generator having a field winding and armature windings comprising:

rectifying means including rectifying transistors individually operatively connected between respective output terminals of the armature windings of the a.c. generator and one of a high and a low voltage terminal of a battery, and a drive controlling circuit for controlling operation of the rectifying transistors;

an exciting current controlling transistor providing on/off control of an exciting current to the field winding of the a.c. generator;

voltage controlling means for controlling a duty ratio of the exciting current controlling transistor so as to decrease a difference between a voltage across the battery and a prescribed reference voltage;

state determining means for determining, according to a parameter associated with a rotation sped of the generator, whether the rotation speed thereof is in a high load torque rotation range in which a load torque of the generator becomes maximum; and exciting current limiting means for limiting the exciting current to less than a prescribed value responsive to the speed of the generator is determined to be in the high load torque rotation range, wherein the rectifying current controlling transistor includes a MOS transistor made, as a base material, of a monocrystalline SiC which is a compound of Si and C.

2. A control system for an a.c. generator as set forth in claim 1, further comprising:

exciting current incrementing means for limiting a rate of increase in the duty ratio to less than a prescribed maximum rate of increase, whereby the exciting current is gradually limited.

3. A control system for an a.c. generator as set forth in claim 1, wherein:

a source-drain withstand voltage and a source-gate withstand voltage of the MOS transistor are each set to be at least 100V.

4. A control system for an a.c. generator as set forth in claim 1, wherein:

the exciting current controlling transistor and the rectifying transistors are accommodated within a same casing and fixed to a housing of the generator.

5. A control system for an a.c. generator as set forth in claim 1 wherein:

the prescribed value of the exciting current is set to be greater than an exciting current value which is necessary for the generator to generate a rated maximum output when the temperature thereof is a prescribed maximum permissible temperature.

6. A control system for an a.c. generator as set forth in claim 1, wherein:

the exciting current limiting means alters the prescribed value of the exciting current according to a prescribed on-vehicle electrical load.

7. A control system for an a.c. generator as set forth in claim 6, wherein:

the exciting current limiting means increases the prescribed value of the exciting current during only a time period in which a large power electrical load which is greater than a load for charging said battery is driven.

8. A control system for an a.c. generator as set forth in claim 2, wherein:

the voltage controlling means and the exciting current incrementing means are integrated on a same chip.

9. A control system for an a.c. generator as set forth in claim 2, wherein:

the drive controlling circuit of the rectifying means, the voltage controlling means and the exciting current incrementing means are integrated on a same chip.

10. A control system for an a.c. generator as set forth in claim 2, further comprising:

means for detecting an engine speed, whereby the exciting current incrementing means decreases the maximum rate of increase when the engine speed is low.

11. A control system for an a.c. generator set forth in claim 2, further comprising:

determining means for determining whether a vehicle travels with its head light lit up, wherein the exciting current incrementing means does not limit the rate of increase in the exciting current if the vehicle is determined to be traveling with its head light lit up.

12. A control system for an a.c. generator as set forth in claim 1, wherein the rectifying current controlling transistor includes a substrate of the monocrystalline SiC having one semiconductor region of one conductive type on which a reverse channel is formed, and a source region and a drain region which are of another conductive type opposite to the one conductive type and are conducted by the reverse channel.

* * * * *